US008116008B2

(12) United States Patent
Prior et al.

(10) Patent No.: US 8,116,008 B2
(45) Date of Patent: Feb. 14, 2012

(54) SYSTEM AND METHOD FOR LENS PERFORMANCE OPTIMIZATION USING ELECTRONIC ABERRATION CORRECTION

(75) Inventors: Gregory A. Prior, San Jose, CA (US); Gopal Ramachandran, Saratoga, CA (US); Zorawar S. Bassi, Ontario (CA)

(73) Assignee: Geo Semiconductor Inc., Santa Clara, CA (US)

( * ) Notice: Subject to any disclaimer, the term of this patent is extended or adjusted under 35 U.S.C. 154(b) by 260 days.

(21) Appl. No.: 11/770,082

(22) Filed: Jun. 28, 2007

(65) Prior Publication Data
US 2009/0002835 A1    Jan. 1, 2009

(51) Int. Cl.
 *G02B 27/14*    (2006.01)
(52) U.S. Cl. .............................. 359/637; 382/275; 703/6
(58) Field of Classification Search .................. 359/637; 703/2, 6; 382/275
See application file for complete search history.

(56) References Cited

U.S. PATENT DOCUMENTS

| | | | | |
|---|---|---|---|---|
| 5,025,313 A * | 6/1991 | Parulski et al. | ................ | 358/514 |
| 5,369,450 A * | 11/1994 | Haseltine et al. | ............. | 348/745 |
| 5,889,625 A * | 3/1999 | Chen et al. | .................... | 359/637 |
| 6,323,934 B1 * | 11/2001 | Enomoto | ......................... | 355/40 |
| 2004/0150732 A1 * | 8/2004 | Yamanaka | .................... | 348/272 |
| 2006/0120620 A1 * | 6/2006 | Bassi et al. | .................... | 382/276 |
| 2008/0062164 A1 * | 3/2008 | Bassi et al. | .................... | 345/214 |
| 2008/0166043 A1 * | 7/2008 | Bassi et al. | .................... | 382/167 |

* cited by examiner

*Primary Examiner* — James Greece
(74) *Attorney, Agent, or Firm* — Sughrue Mion, PLLC

(57) ABSTRACT

A method for optimizing cost and performance in a lens assembly is disclosed. The method relaxes the constraints of optically correcting lateral chromatic aberration and distortion on the lens assembly and instead electronically corrects for lateral chromatic aberration and distortion. As a result the lens assembly transmissivity and MTF improve dramatically and other aberrations are reduced as a result of re-optimizing the lens assembly merit function. The cost and volume of the lens assembly are reduced as well. The optimized lens assembly could be used in rear or front projection display devices as a well as image acquisition devices.

28 Claims, 28 Drawing Sheets

SYSTEM AND METHOD FOR LENS PERFORMANCE OPTIMIZATION USING ELECTRONIC ABERRATION CORRECTION

FIELD

Various embodiments are discussed relating to optimizing a lens design, and in particular, optimizing a lens design in projection display systems and in image acquisition systems using electronic aberration correction.

BACKGROUND

Lens assemblies for image projection systems and image capture systems are subject to many different aberrations due to the limitations of physical realization. These different aberrations detract from the performance of a lens due to cost, availability, or weight of extra elements. Lens designers in today's industry continually experience market pressures to reduce cost and increase performance.

SUMMARY

The embodiments described herein provide in one aspect a method for cost and performance optimization in a lens assembly having at least one lens element, said method comprising simplifying the lens assembly by relaxing the constraints of optically correcting lateral chromatic aberration (LCA) and distortion, and electronically warping the image data for each color component independently to pre-compensate for LCA and distortion.

The embodiments described herein provide in one aspect a method for cost and performance optimization in a projection display system adapted to project an image based on image data through a lens assembly having a plurality of lens elements onto a display surface, said method comprising simplifying the lens assembly by relaxing the constraints of optically correcting lateral chromatic aberration and distortion, and electronically warping the image data for each color component independently to pre-compensate for lateral chromatic aberration and distortion.

The embodiments described herein provide in one aspect a method for capturing an image in an image acquisition system having a lens assembly with at least one zoom lens element, said method comprising simplifying the lens assembly by relaxing the constraints of optically correcting lateral chromatic aberration and distortion, and electronically warping the image data for each color component independently to pre-compensate for lateral chromatic aberration and distortion.

Further aspects and advantages of the embodiments described herein will appear from the following detailed description along with the accompanying drawings.

BRIEF DESCRIPTION OF THE DRAWINGS

For a better understanding of the embodiments and/or related implementations described herein and to show more clearly how it may be carried into effect, reference will now be made, by way of example only, to the accompanying drawings which show at least one exemplary embodiment and/or related implementation in which:

FIG. 4-B is the lateral chromatic aberration (LCA), diagram of the prior art lens assembly;

FIG. 10-B is the distortion diagram of the lens assembly of FIG. 5 after electronic correction;

FIG. 15-B is the LCA diagram of the lens assembly of FIG. 11 after electronic correction;

FIG. 16-B is the distortion diagram of the lens assembly of FIG. 11 after electronic correction;

FIG. 22-B is the LCA diagram of the lens assembly of FIG. 17 after electronic correction;

FIG. 23-B shows a geometry and color correction unit of the exemplary embodiment.

DETAILED DESCRIPTION

Figure 1:
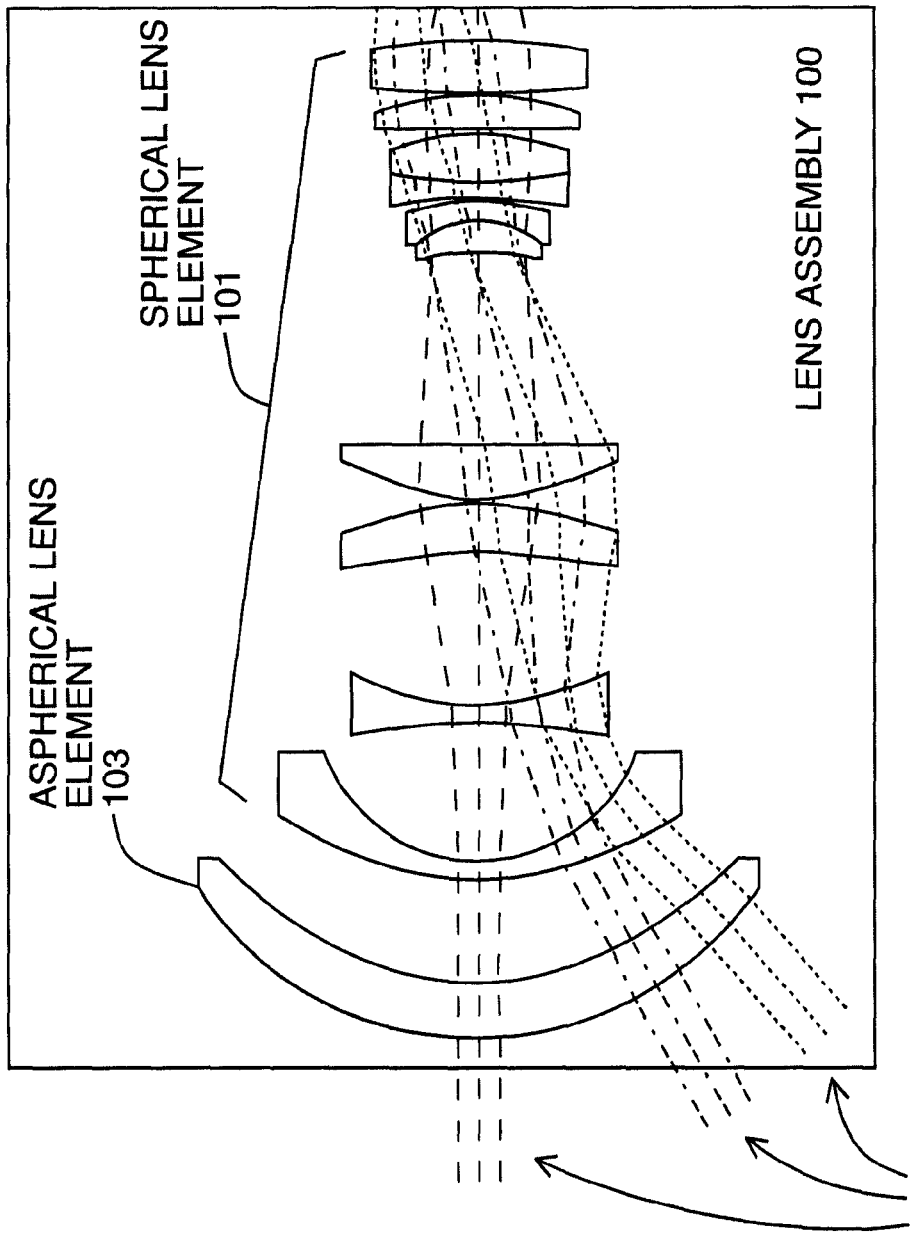
FIG. 1 is a schematic diagram of an eleven element prior art lens assembly design.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

Lens assemblies are used in a variety of applications including, but not limited to, image projection devices and image acquisition devices. In most of these applications the lens assembly cost vs. performance is a design issue. Aberrations are the main issue in a lens assembly design. High-end lens assembly designs use low dispersion glass and additional lens elements to partially overcome aberrations. Nevertheless, these prior art design still suffer from aberrations and particularly the ones that are difficult to solve optically.

Optical aberrations are caused by intrinsic lens properties as well as lens imperfections. They include lateral chromatic aberration (LCA), axial chromatic aberration, as well as the five Seidel aberrations, namely, spherical aberrations, coma, astigmatism, field curvature, and distortion.

In a typical prior art lens assembly design, great effort goes into reducing the LCA. This is due to the fact that LCA is hardest to correct using optical components and it has an undesired effect on the quality of an image. As such, a number of lens elements in a typical prior art lens assembly design are mainly devoted to the correction of LCA.

Lens assemblies are used in image projection as well as image acquisition systems. Image projection systems include front projection display systems as well as rear-projection display systems. Image acquisition systems include cameras, both for still and motion pictures, telescopes, and microscopes.

A typical image projection system includes a light engine, an image modulation device, projection optics, and a display surface. A typical prior art rear projection display system (RPDS) uses a fixed-focal length lens system to project an image onto the back of a screen.

A typical front projection display system (FPDS) uses a lens assembly including zoom lens elements in order to accommodate different display screen sizes (due to focal length changes) at a fixed projection lens distances.

Likewise, in image acquisition systems like cameras and camcorders, a lens assembly including zoom lens elements is used to capture scenes at different focal lengths and therefore different field angles from the camera lens.

In all these applications, the lens assembly is required to provide aberration free image display or image capture. Typically, careful choice of lens materials and extra lens elements is required to correct for optical aberrations.

The exemplary embodiments enable use of a simplified lens design with improved performance in all these cases via electronic correction to compensate for distortion and LCA. In particular, depending on the application (image capture or projection, for example), illumination source (broadband or narrowband, for example), LCA or distortion may be more or less constrained in order to simplify the design of the lens assembly and to gain enhanced Modulation Transfer Function (MTF) performance. The resulting LCA and distortion are then corrected electronically by warping each color component of the image data independently. The resulting image can be essentially free of distortion and LCA.

In the following, an exemplary embodiment, namely an RPDS application is described. It should be noted that this embodiment however, is just one example implementation and that many other applications using a lens assembly are contemplated.

In this exemplary embodiment, a prior art lens assembly used for a conventional 480i Standard Definition Rear Projection TV (SD-RPTV) was taken as a starting point. The rear projection lens assembly was re-designed and re-optimized with the goal of reducing cost and improving performance.

Figure 2:
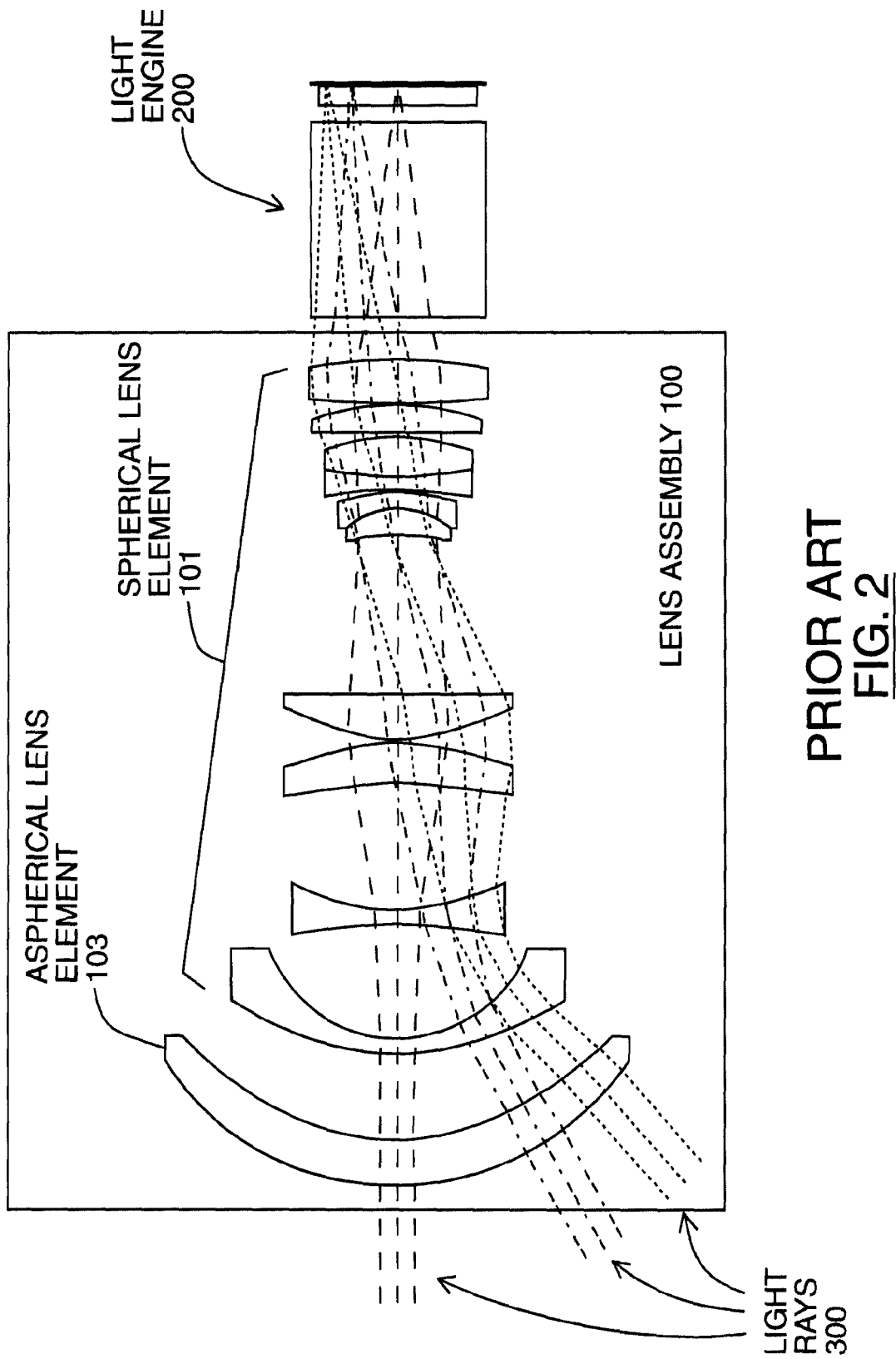
FIG. 2 is a schematic diagram of a prior art lens assembly design coupled to a light engine.

Referring to FIG. 1, the prior art lens assembly 100 consists of eleven lens elements, including ten spherical and one aspherical lens elements. As shown in FIG. 1, spherical lens element 101 and aspherical lens element 103 are used to project light rays 300. FIG. 2 shows the lens assembly 100 coupled to light engine 200 which is adapted to generate a beam of light and create a modulated image.

Different examples of the optimization and performance improvement of the prior art lens assembly are now discussed.

In the first example, the number of lens elements is kept unchanged. This example is used as benchmarking for electronic correction of LCA and distortion. In the next two examples, three lens elements are eliminated. In one of these examples the eliminated lens elements includes an aspherical plastic element, and two elements made of expensive (as much as 20× to 30× more expensive than bulk glass) low-dispersion glass. This equates to a 67% reduction in glass costs. In the last example given here, three elements made of expensive (as much as 20 to 30 times more expensive than bulk glass) low-dispersion glass are eliminated. In prior art lens assembly designs, low-dispersion glass is needed to reduce LCA.

In the latter two examples, in addition to the cost reduction, the lens performance is increased as the Modulation Transfer Function (MTF) of the modified lens design is adequate for use in a 1080p (about 65 line pairs/mm MTF) High Definition TV (HDTV) as opposed to the original high cost lens assembly which only supported 480i (about 18 line pairs/mm MTF).

In addition to the significant improvement in the MTF, the modified lens assembly, in combination with electronic correction, has less axial chromatic aberration, less coma, less spherical aberrations, less astigmatism, decreased field curvature aberration and better light transmission than the original prior art design. Correcting LCA and/or distortion with electronics allows the merit function used by lens optimization tools to be weighted much more towards correcting these other aberrations. This stems from the fact that correcting LCA optically is much more difficult than correcting the other optical anomalies.

To achieve these goals, the exemplary embodiments use independent electronic warping of the individual color components to correct for distortion and LCA. This technology removes a huge burden on the lens designer by relaxing the constraints for optical correction of distortion and LCA.

FIG. 1 shows the prior art SDTV lens assembly. This lens is described in U.S. Pat. No. 7,057,825. As shown in FIG. 1, there are eleven lens elements in the lens assembly. FIG. 2 shows the same lens assembly coupled to a light engine 200. There are rays traced at 3 field points—on axis, 70% of the field, and 100% of field. For each of the field points, three rays are traced, one at the top, center and bottom of the pupil, for a total of nine rays traced. This prior art lens assembly design is used for a resolution of 640×480. The MTF is 50% at 18 cycles/mm as seen in FIG. 3.

In the prior art design, LCA is about 0.015 mm (about ½ pixel), and distortion is about 1.75%.

Figure 3:
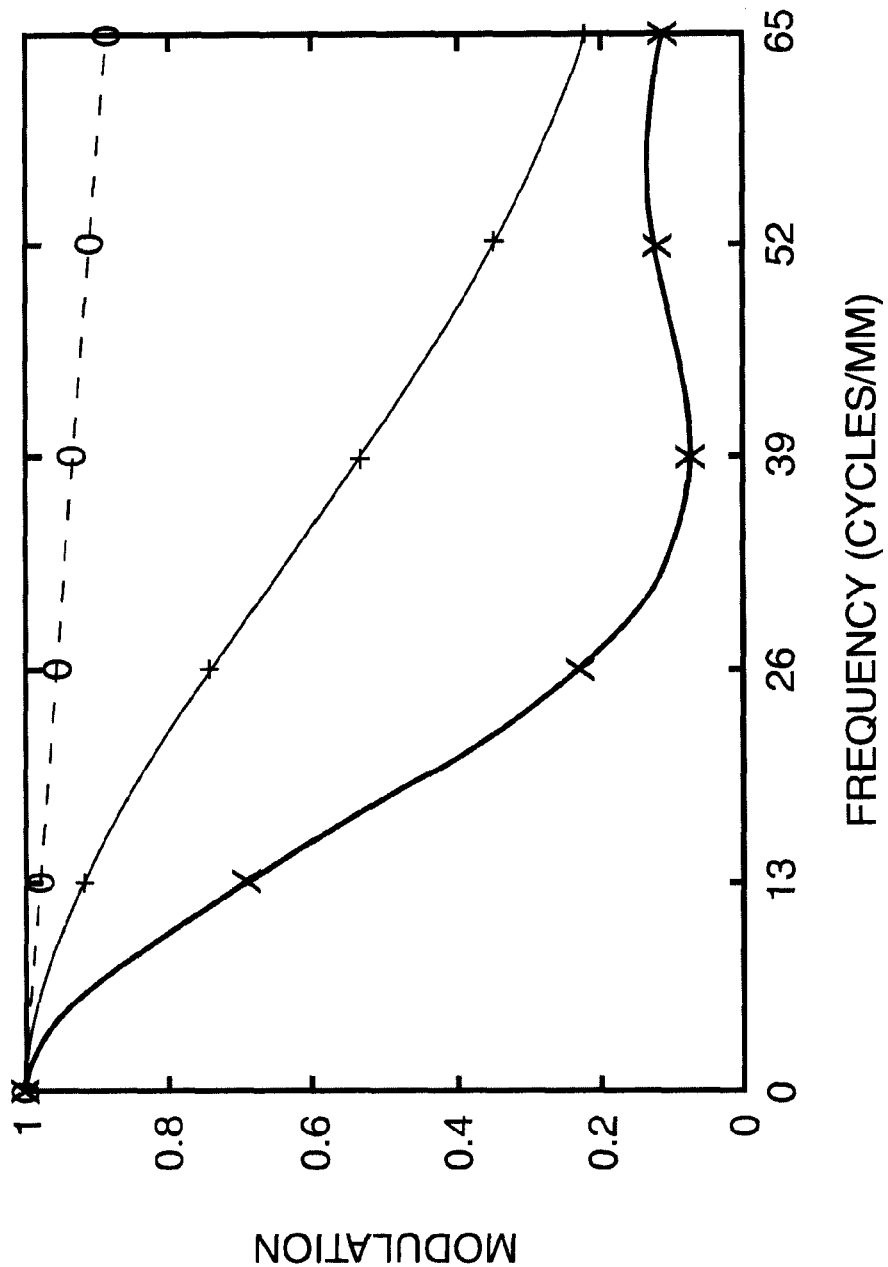
FIG. 3 is the Modulation Transfer Function (MTF) diagram of the prior art lens assembly.

FIG. 3 shows the MTF of the original prior art lens design. The MTF describes the ability of an optical system to transfer contrast. For example, if a series of alternating white and black bars is drawn at a specific spatial frequency, when these bars are observed, the image contrast will be somewhat degraded. The white bars may appear somewhat darker and the black bars will be somewhat lighter.

By definition, the MTF at a given spatial frequency is defined as follows:

$$MTF(f) = \frac{M(\text{image})}{M(\text{source})}$$

Where the modulation (M), is derived from the Luminance (L) of either the image or the source as follows:

$$M = \frac{L_{max} - L_{min}}{L_{max} + L_{min}}$$

FIG. 3 shows the tangential (+ symbol) and sagittal (× symbol) MTF as well as the diffraction limit (o symbol). The MTF supports a 0.8" diagonal panel with resolution 640 by 480 pixels using 27 micron pixels. A 40% modulation of 18 cycles/mm is supported at the edges.

Figure 4A:
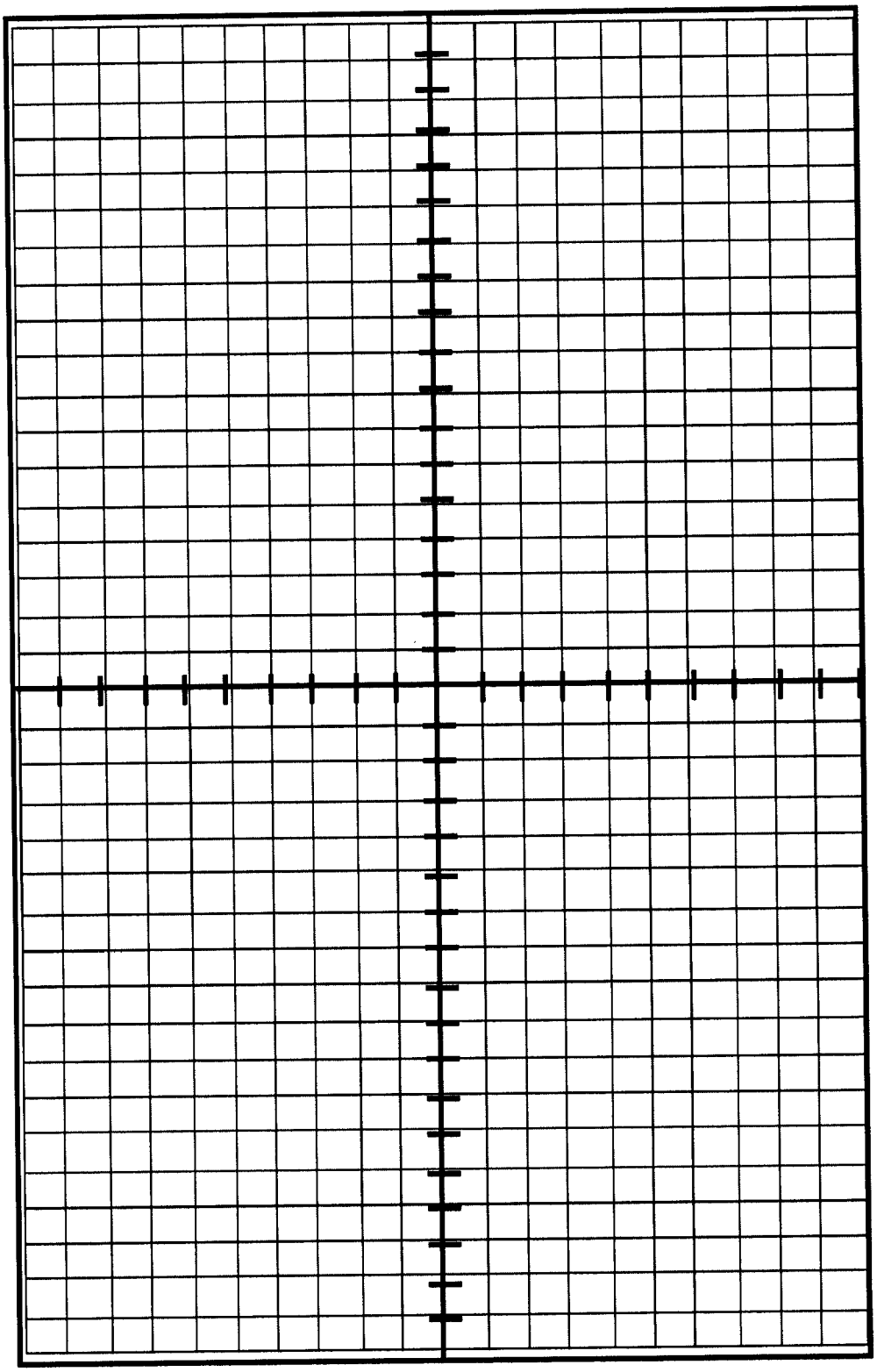
FIG. 4-A is the distortion diagram of the prior art lens assembly.
Figure 4B:
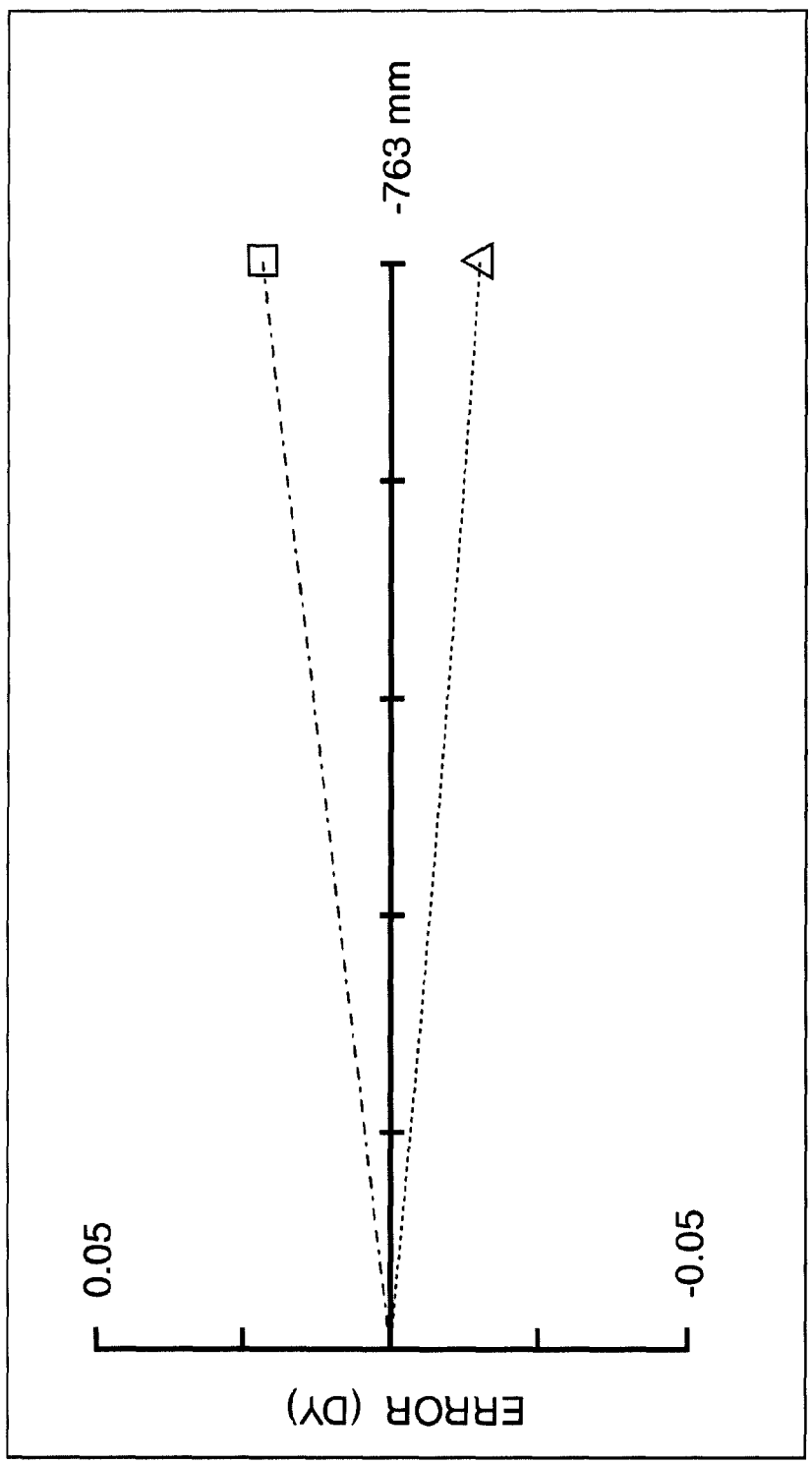

FIG. 4-A shows the distortion plot of the prior art lens assembly design. This design was capable of keeping the maximum distortion to −1.75%. FIG. 4-B shows the LCA plot of the prior art lens assembly design.

The overall transmissivity for the prior art lens design is 77%, taking into account the lens elements in the light path, and the reduced transmittivity of the aspherical lens element 103 which is made of plastic.

Three examples of re-optimized lens designs are now described: The first example will retain the same number of elements but is optimized without constraining distortion or LCA. The second example has three fewer lens elements with all-spherical surfaces, unconstrained LCA and distortion. As a result, it has about 17% distortion, and 23-pixel LCA. The third example has three fewer lens elements but it retains a plastic aspherical lens element, and has 1% distortion, and 13-pixel LCA. According to the exemplary embodiments discussed here, as will be shown, large amounts of LCA can be corrected by electronic warping methods to sub-pixel magnitudes.

Any of the designs using the techniques of the exemplary embodiments discussed would be excellent for use with illumination sources that can provide light flux at several distinct wavelengths. Correcting LCA precisely for the wavelengths used for color imaging allows efficient use of available light energy without loss of brightness, and minimization of artifacts due to uncorrected LCA. As such, in the exemplary embodiments, the use of independent electronic correction for each color component allows considerable design flexibility.

Figure 5:
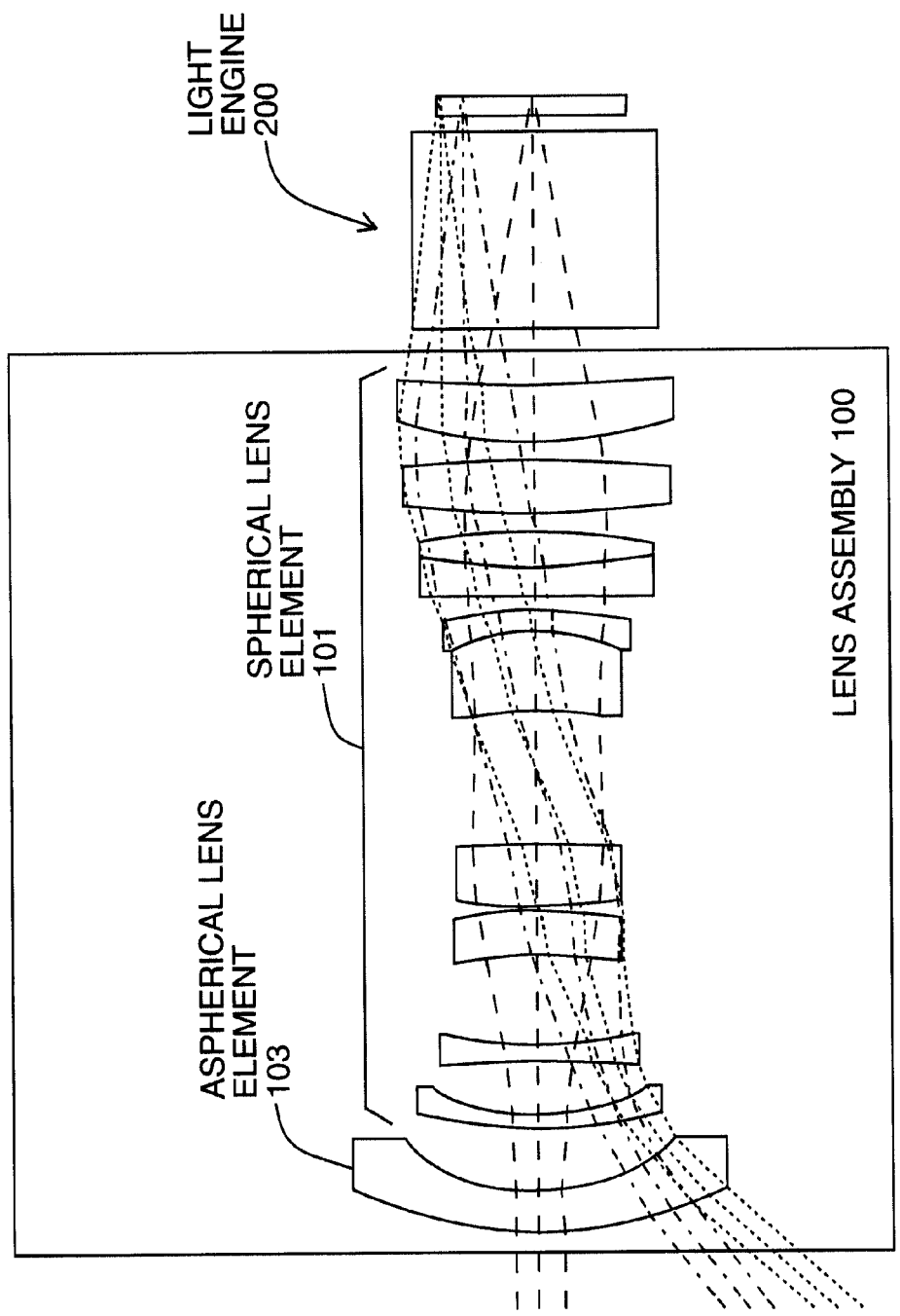
FIG. 5 is a schematic diagram of the prior art lens design with the distortion and LCA correction constraints removed.
Figure 6:
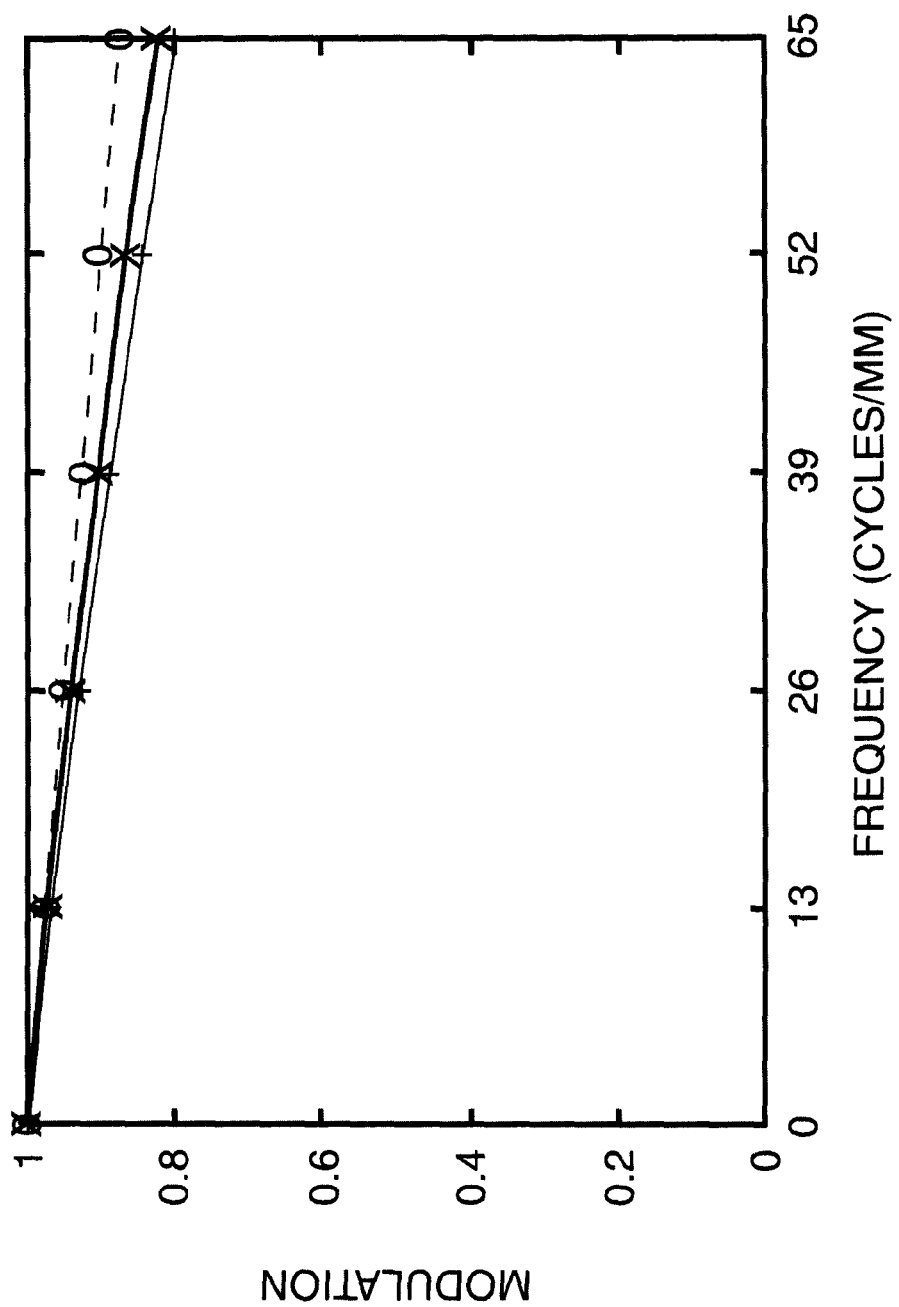
FIG. 6 is the MTF diagram of the lens assembly of FIG. 5 at 550 nm of the lens assembly with the distortion and LCA correction constraints removed (scale=65 line pair/mm)
Figure 7:
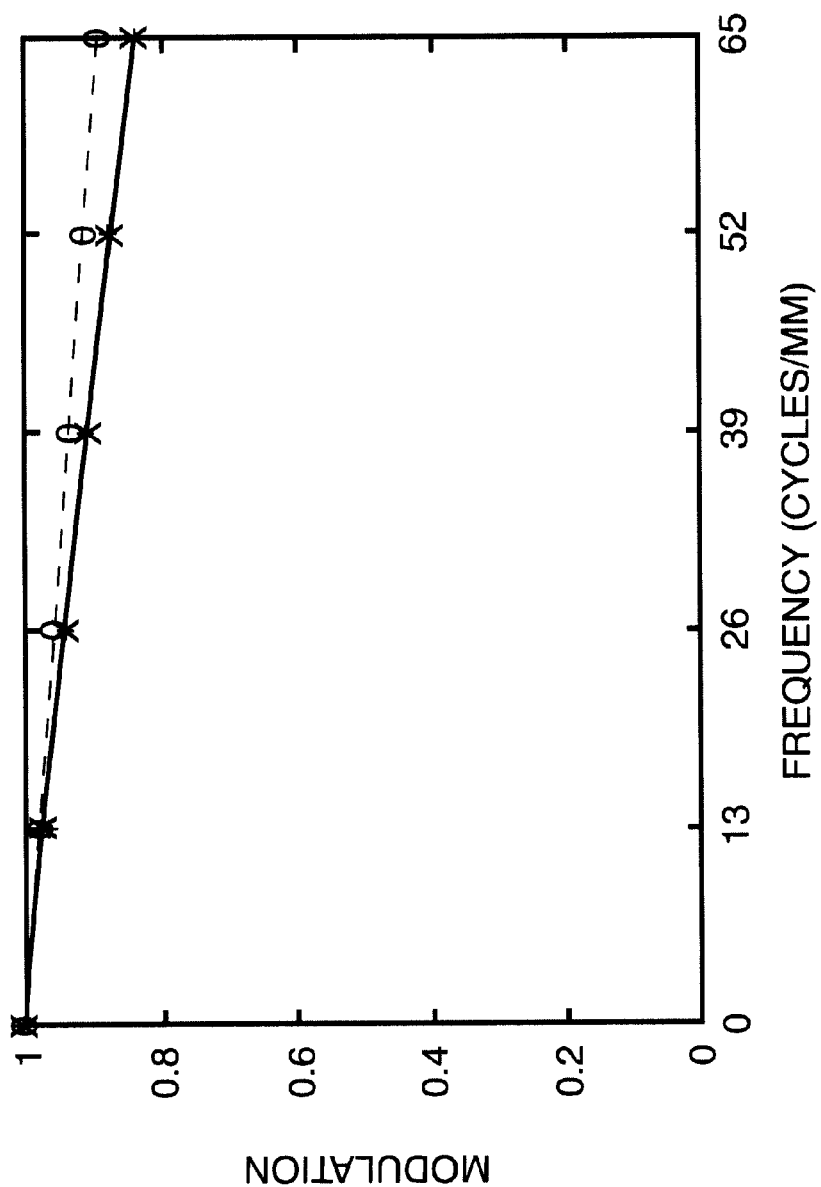
FIG. 7 is the MTF diagram of the lens assembly of FIG. 5 at 460 nm of the lens assembly with the distortion and LCA correction constraints removed (scale=65 line pair/mm)
Figure 8:
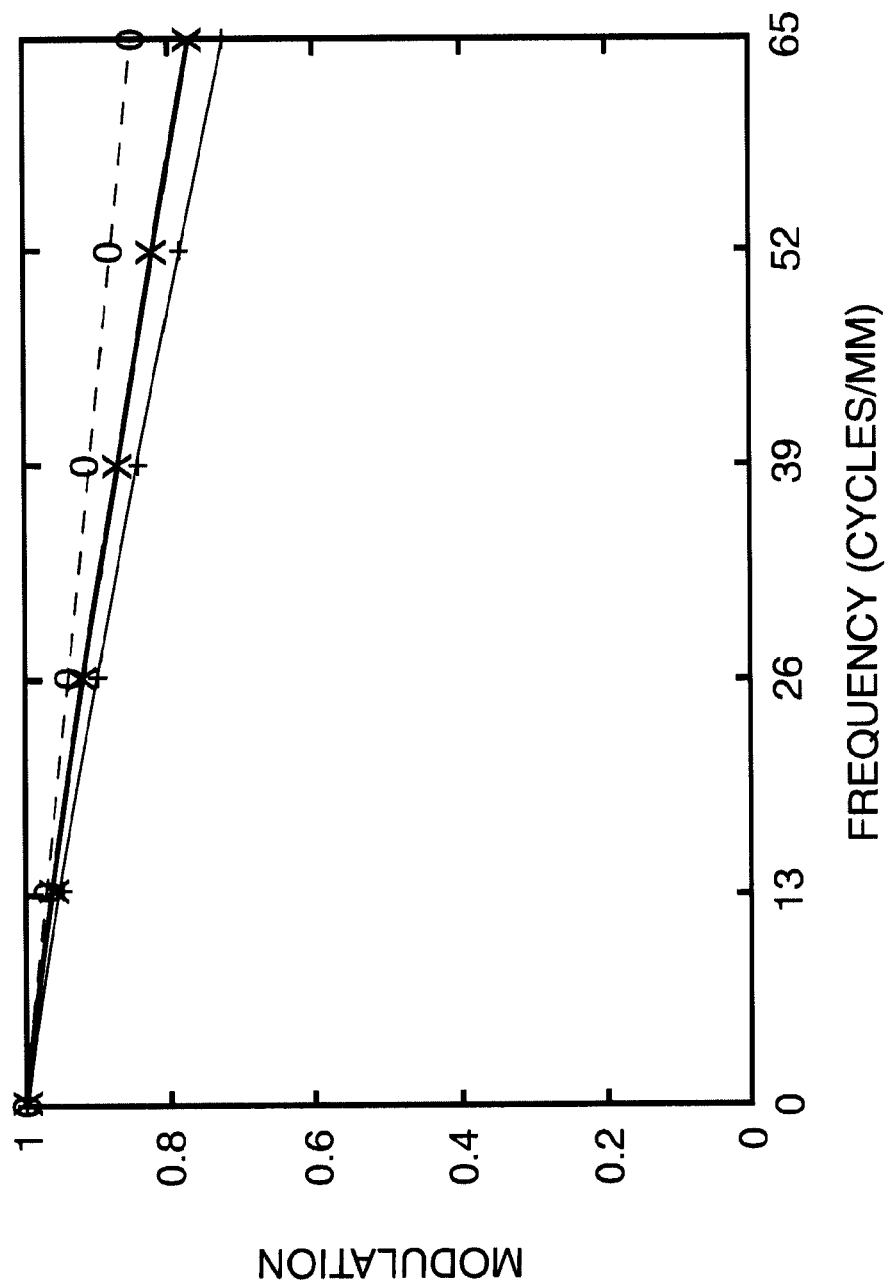
FIG. 8 is the MTF diagram of the lens assembly of FIG. 5 at 640 nm of the above lens assembly with the distortion and LCA correction constraints removed (scale=65 line pair/mm)
Figure 9:
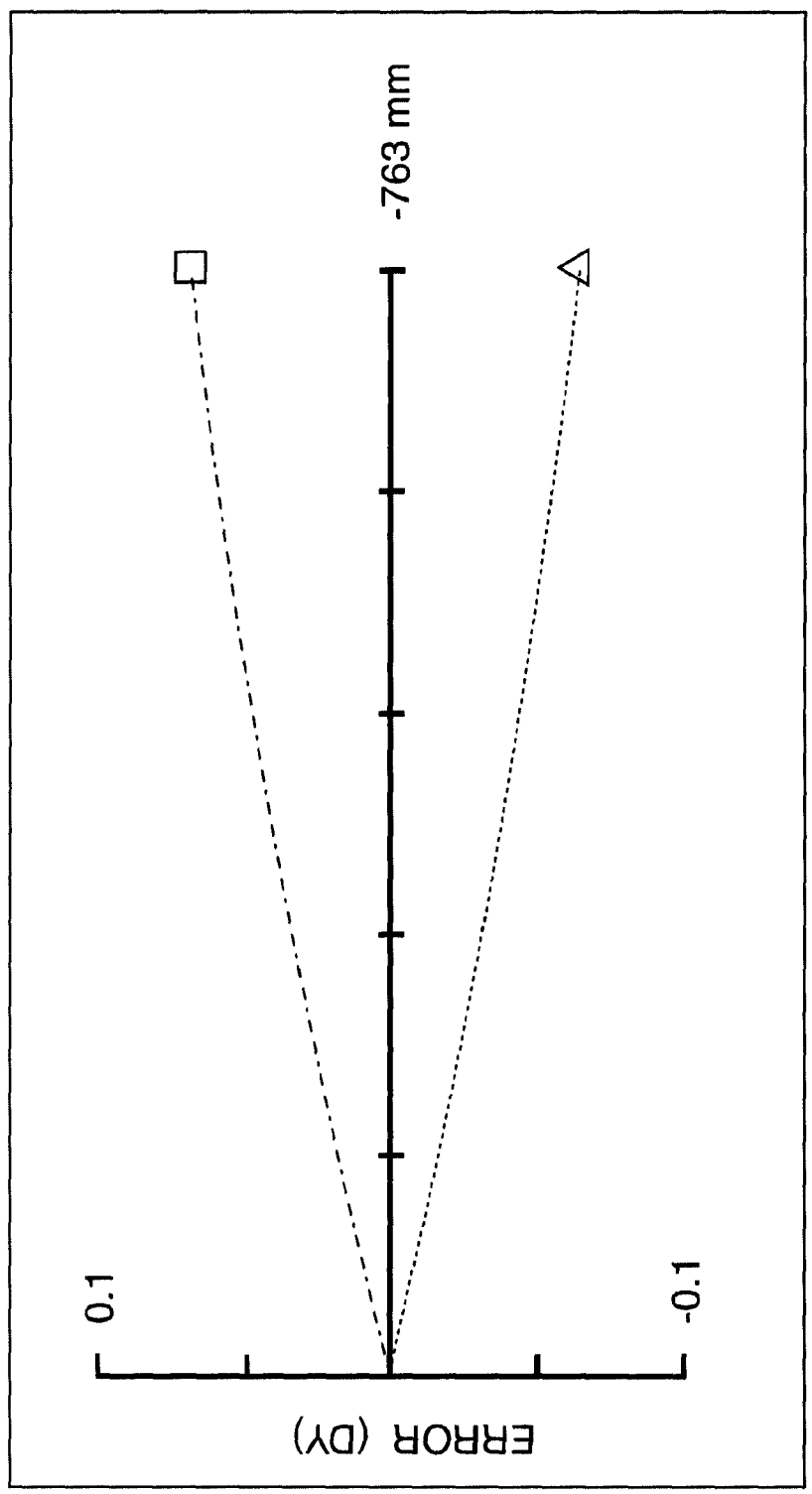
FIG. 9 is the LCA diagram of the lens assembly of FIG. 5 with the distortion and LCA correction constraints removed (scale+−0.1 mm)

FIG. 5 shows an eleven element, optimized design. The glass material as well as curvatures and thicknesses were allowed to change in this example compared with the prior art lens assembly. This improved lens design is capable of resolving 125 cycles/mm at 50% MTF allowing for a resolution of greater than 1920×1080. This excess performance means that the lens can be re-optimized for lower cost. The purpose of this example was to push the limit of MTF, completely sacrificing LCA and distortion, not to get a balanced compromise between those elements. FIGS. 6, 7, and 8 are monochromatic MTF plots. Considerable improvement in the value of the MTF can be seen as it is greater than 80% at 65 lp/mm. FIG. 9 shows that LCA is about 68 um, or 9 pixels.

Figure 10A:
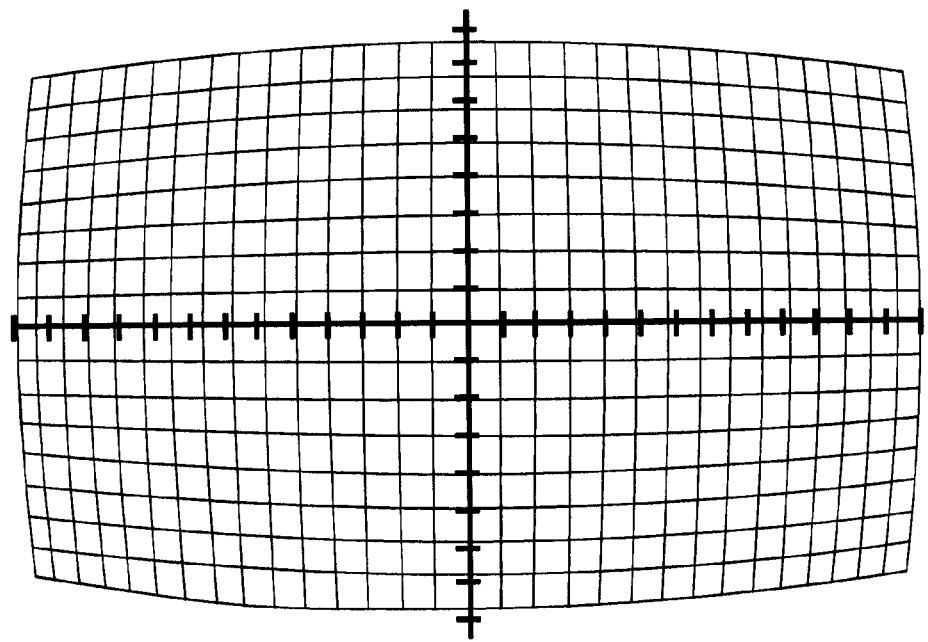
FIG. 10-A is the distortion diagram of the lens assembly of FIG. 5 before electronic correction.
Figure 10B:
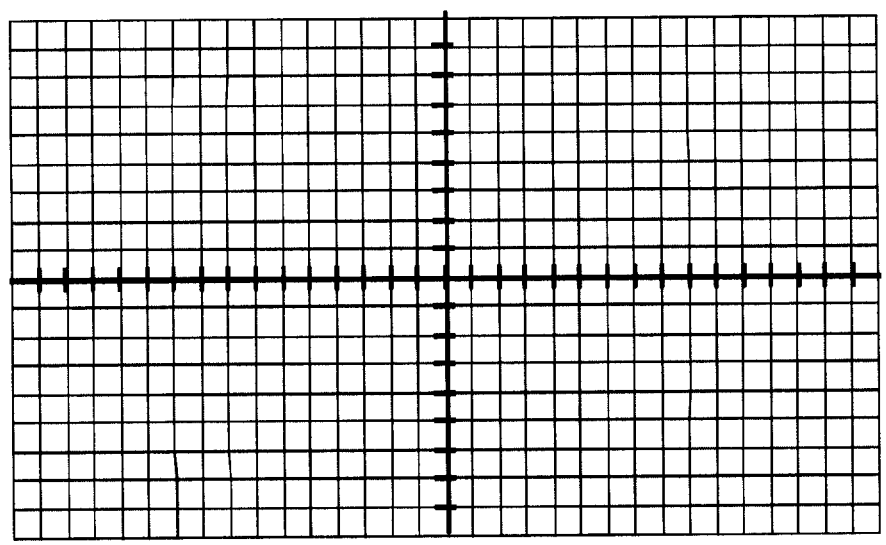

In this example, an order of magnitude improvement in astigmatism and spherical aberration has been achieved. The LCA is 0.068 mm, or about nine pixels as shown in FIG. 9. The distortion is about 13%. Both of these are corrected with independent electronic warping for each color component. FIGS. 10-A and 10-B illustrate the original distortion and the residual distortion after electronic correction respectively.

Figure 11:
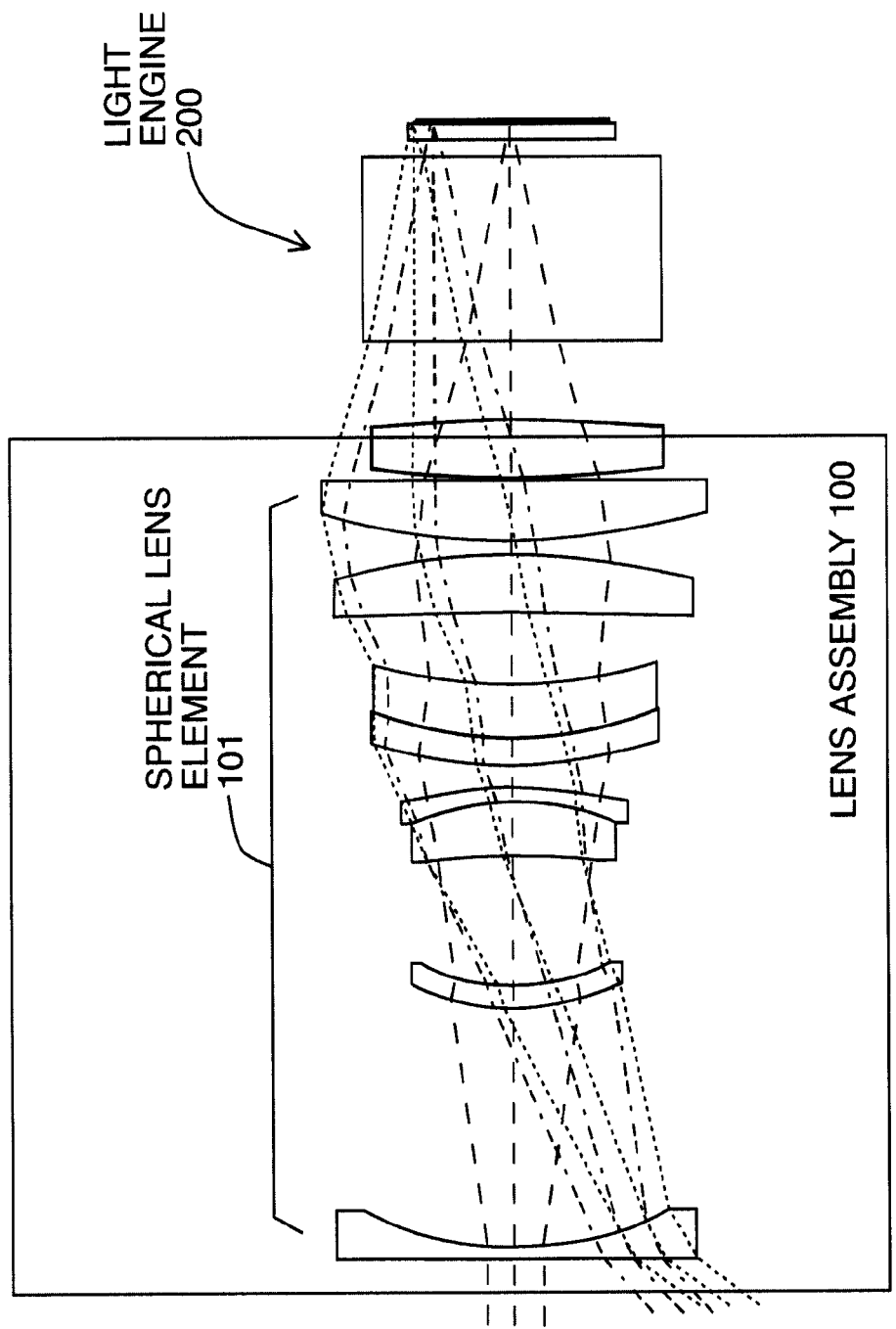
FIG. 11 is a schematic diagram of an all spherical, eight-element optimization of the prior art lens design.

The excess performance of the above example of the optimized lens assembly illustrates that the design could be re-optimized with fewer and less costly lens elements, yet with higher performance than the original lens assembly design. FIG. 11 shows an exemplary embodiment in which an eight-element, all-spherical optimized design has been used. In this example, two high-cost, low-dispersion and one aspherical lens elements have been eliminated which amounts to a significant cost reduction. LCA and distortion are both left unconstrained in the optimization. The merit function has been optimized for all other distortions.

Figure 12:
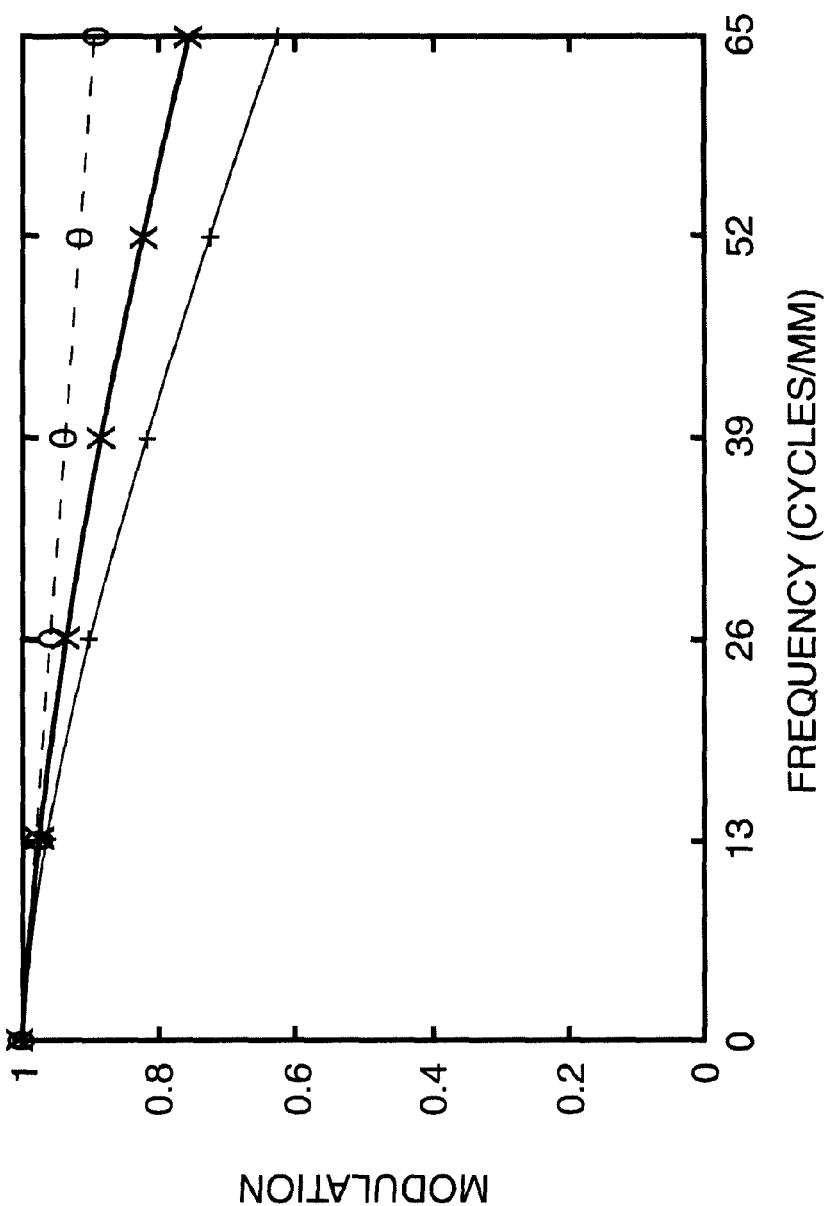
FIG. 12 is the MTF diagram of the lens assembly of FIG. 11 at 550 nm of the above lens assembly (scale=65 line pair/mm)
Figure 13:
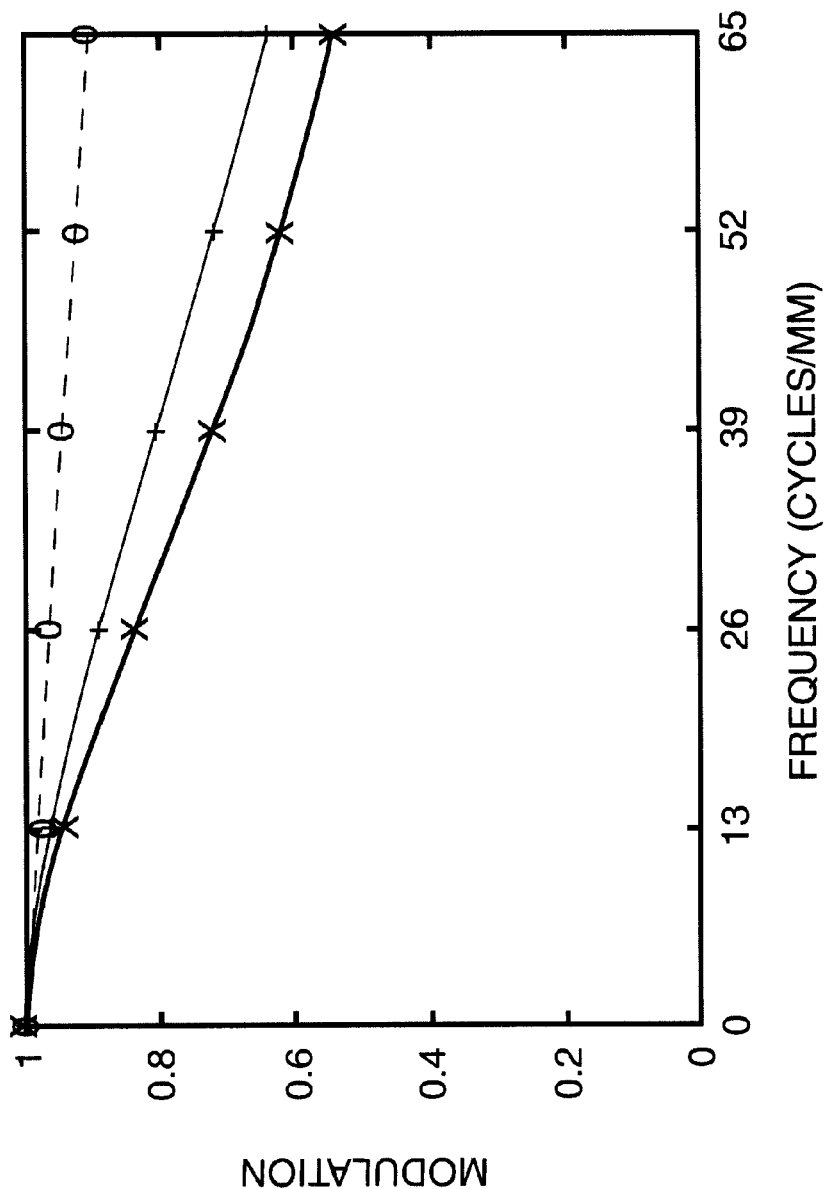
FIG. 13 is the MTF diagram of the lens assembly of FIG. 11 at 460 nm of the above lens assembly (scale=65 line pair/mm)
Figure 14:
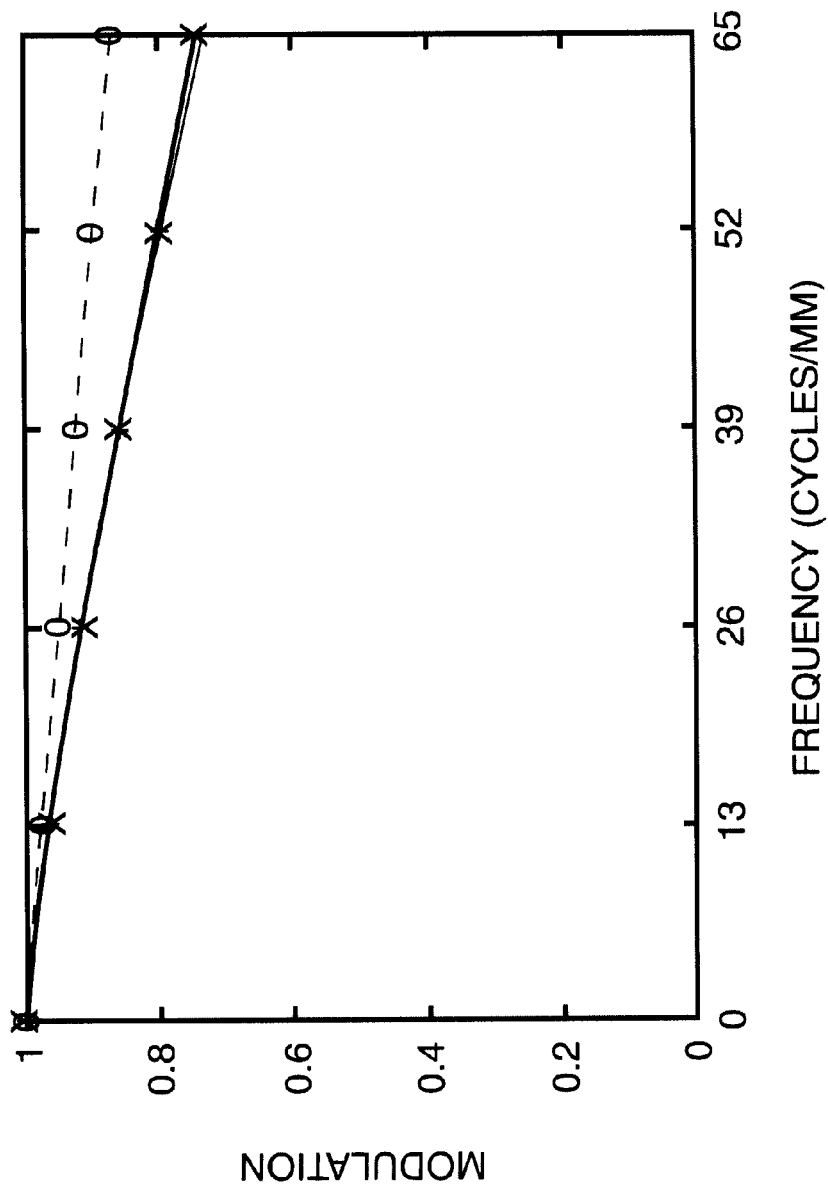
FIG. 14 is the MTF diagram of the lens assembly of FIG. 11 at 640 nm of the above lens assembly (scale=65 line pair/mm)
Figure 15A:
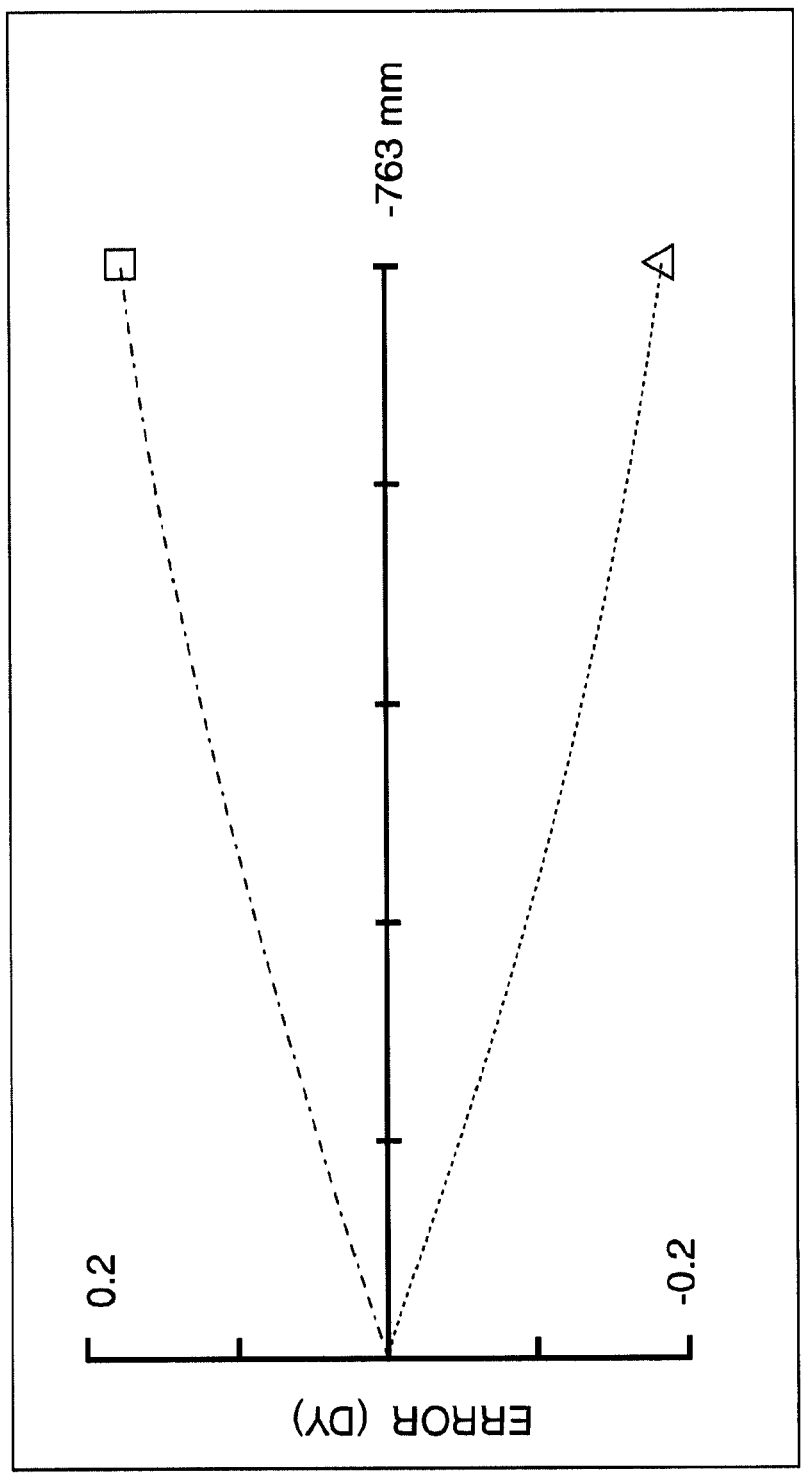
FIG. 15-A is the LCA diagram of the of the lens assembly of FIG. 11 before electronic correction.
Figure 15B:
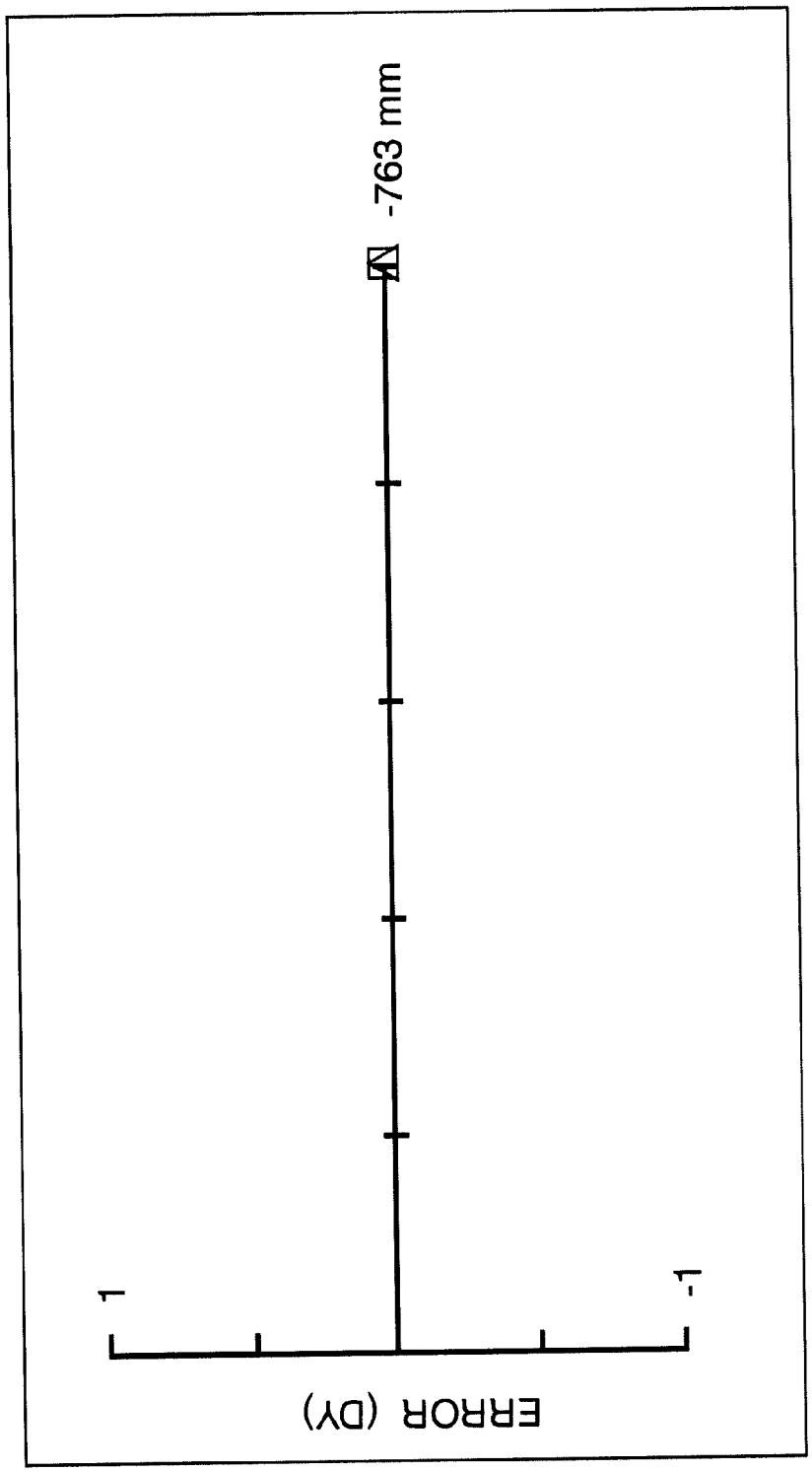
Figure 16A:
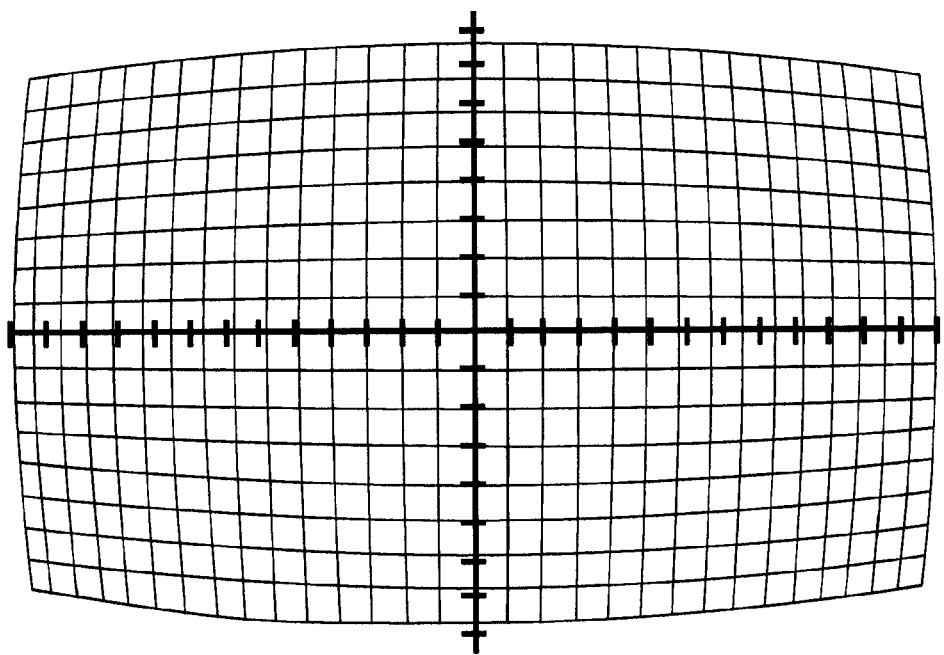
FIG. 16-A is the distortion diagram of the lens assembly of FIG. 11 before electronic correction.
Figure 16B:
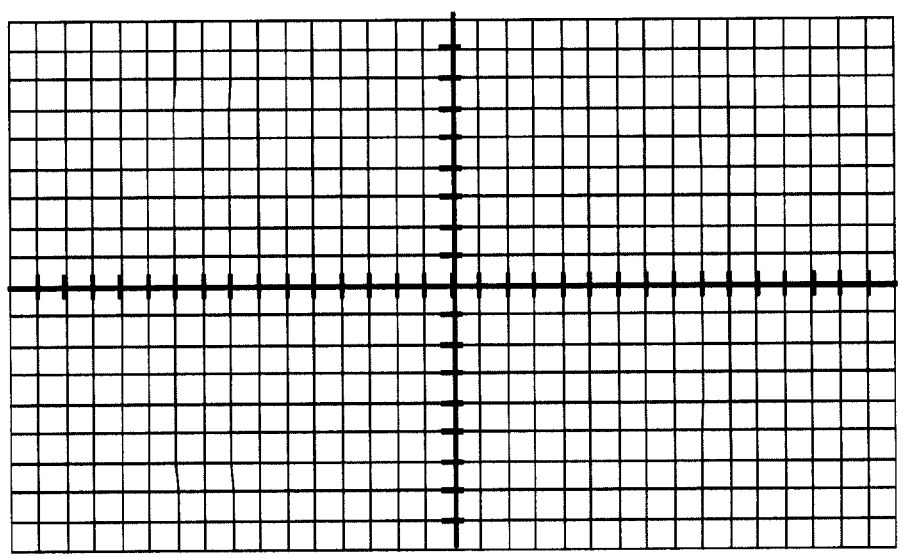

FIGS. 12, 13, and 14 are the monochromatic MTF plots of this example. It can be seen that there is considerable improvement over the prior art lens assembly MTF shown in FIG. 3. FIGS. 15 and 16-A show the LCA and distortion of this example respectively which have increased dramatically from the prior art lens assembly. However, these are corrected electronically by warping individual color component data to better than the prior art design's specs. After electronic correction, the residual LCA is typically less than 0.1 of a pixel. The distortion is typically less than 0.35%.

It should be noted that traditional measurements of MTF used polychromatic data. In other words, MTF was determined by the distribution of the energy contained in all the color components. LCA effects caused degradation in MTF because each color component could potentially move in a different direction or assume different shapes caused by different aberrations. Electronic correction allows independent control of each color component's position, causing sharper and more distinct line pairs, resulting in improved MTF. In addition, this leads to a more useful method for estimating resolution and image sharpness, namely, weighting the individual color components according to their aberrations. As such, a new monochromatic measurement of MTF for individual color components is in order as shown in FIGS. 12, 13, and 14.

It should be noted that in this exemplary embodiment, the light transmission for the all-spherical eight-element modified lens improves 16% from 0.77 to 0.89. This is due to two factors: the elimination of the plastic aspherical element (92% transmission compared to 99% for glass) and the reduction of the number of lens elements. Depending on the light engine illumination device type one of the following methods is used for optimization. In one particular example relating to monochromatic light engine illumination devices like lasers, the distortion as well as LCA is unconstrained. In another example relating to broadband light engine illumination devices like UHP lamps, the distortion and the LCA are constrained to a loose limit. Electronic warping is used to correct for distortion as well as LCA in both cases. A disadvantage of this approach is that correction of distortion leads to a potential loss of resolution because some pixels have to be turned off and other pixels remapped in order to correct for the distortion. The distortion correction is mainly performed in the green data channel as this is the wavelength to which the human visual system has the highest sensitivity. LCA is then corrected simply by remapping the blue and red sub-pixels to fall on top of the green sub-pixels. FIGS. 15-A and 15-B show the LCA before and after the electronic correction respectively. It is seen that, even though the LCA is degraded compared to the prior art example of FIG. 3, it is better than the prior art performance after electronic correction. FIGS. 16-A and 16-B show the distortion and the residual distortion after electronic correction respectively. The distortion is again better than the prior art performance after electronic correction.

Figure 17:
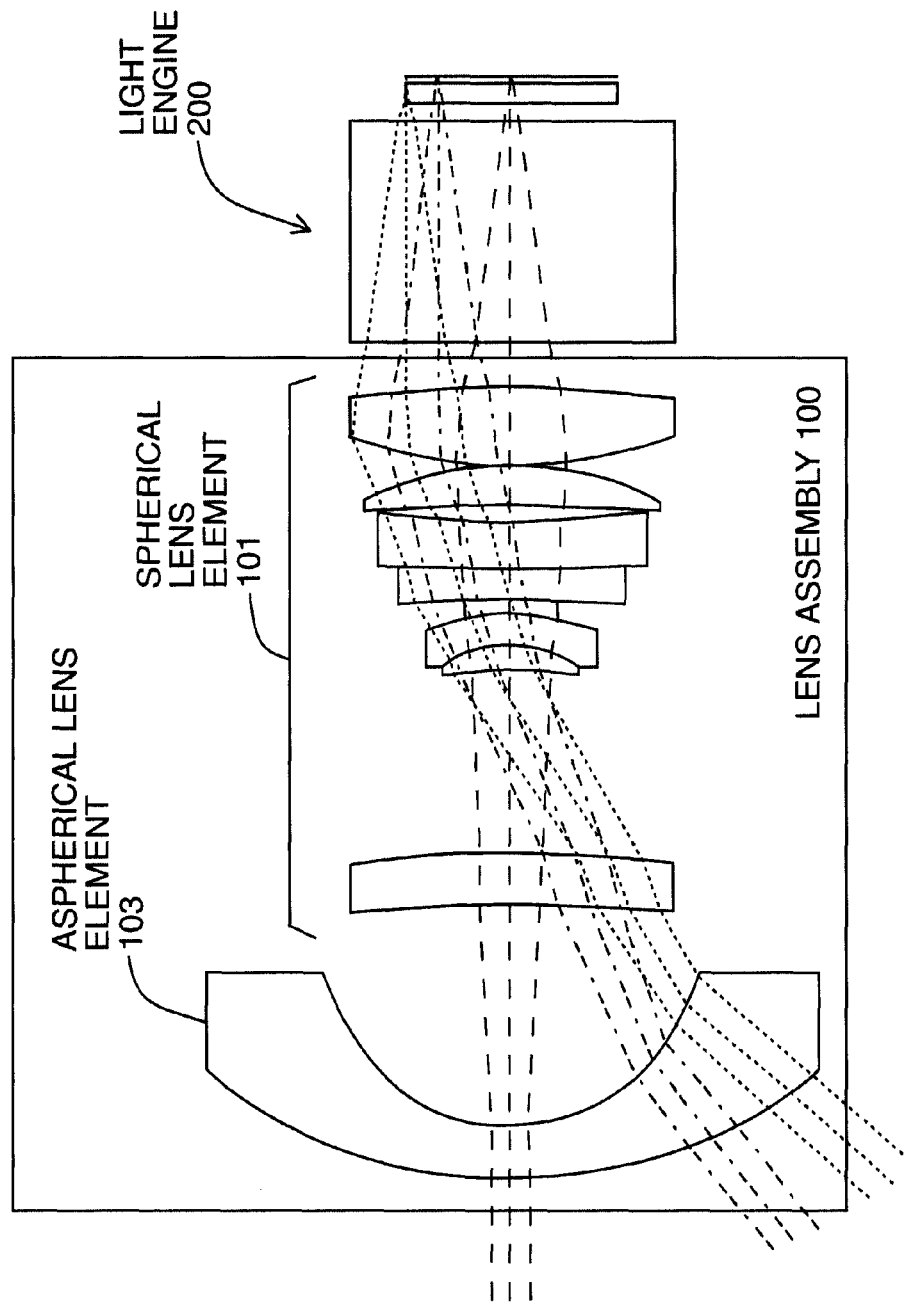
FIG. 17 is a schematic diagram of an all eight-element optimization of the prior art lens design having one aspherical element.

The third exemplary embodiment, shown in FIG. 17, is another optimized eight-element design using the presently disclosed techniques. Unlike the previous example, an aspherical lens element 103 has been used in this design along with seven spherical lens elements 101. In this example, instead of allowing distortion of the green component to be unconstrained, a +−1% distortion limit was imposed on the green color component data. Again, depending on the light engine illumination device type one of the following methods is used for optimization.

In one particular example relating to monochromatic light engine illumination devices like lasers, the distortion as well as LCA was unconstrained. In another example relating broadband light engine illumination devices like UHP lamps, the distortion and the LCA are constrained to a loose limit. This resulted in an eight-element lens with one aspherical plastic element. The motivation to constrain the green color component of data to +−1% distortion is to have minimal loss of resolution (+−1%) where the human visual system is most sensitive. The LCA is corrected by electronic warping of individual color components. The distortion constraint forces the use of one aspherical element 103, but the unconstrained LCA still allows the savings on other lens elements.

Figure 18:
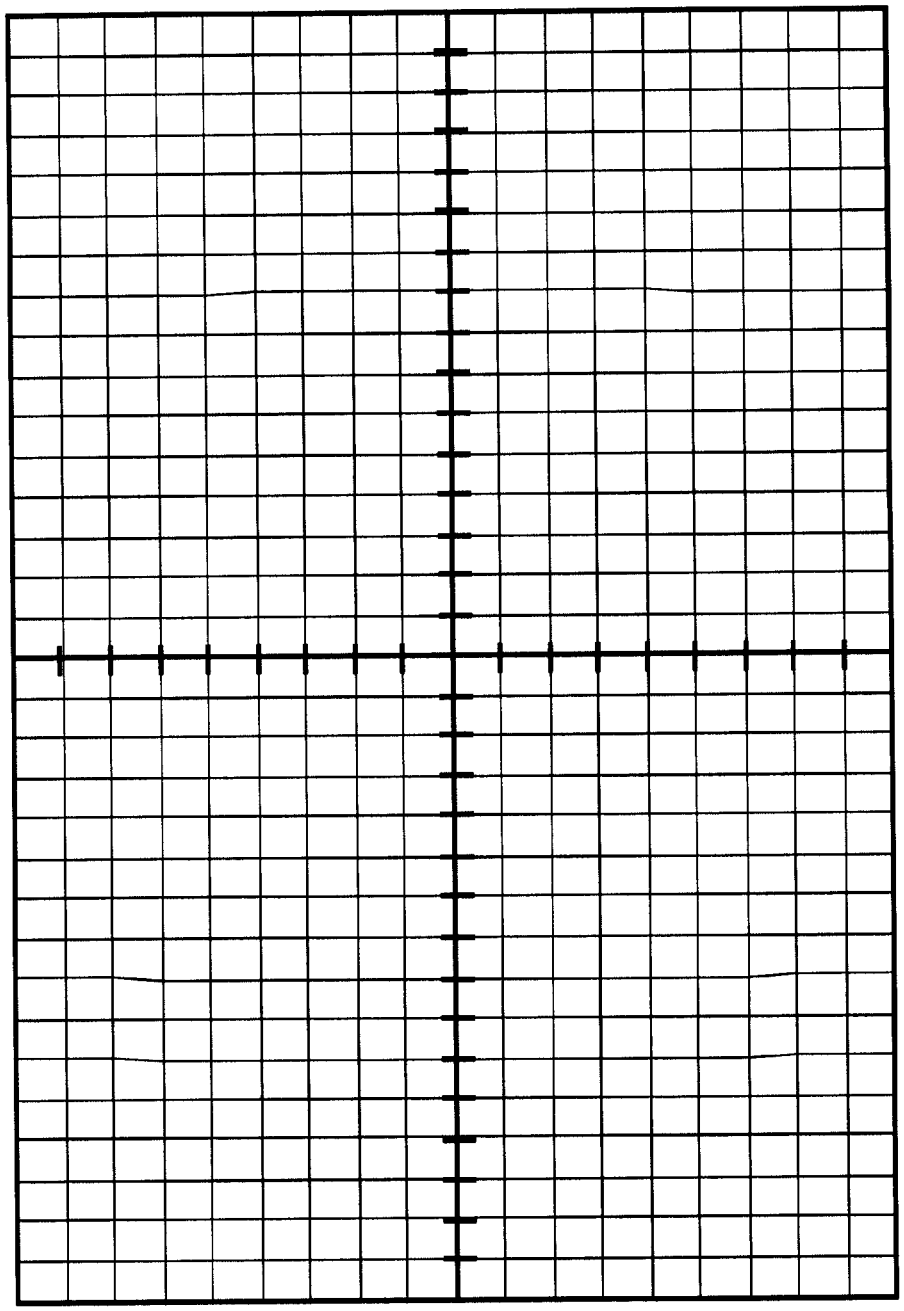
FIG. 18 shows the green color component distortion imposed on the lens assembly design of FIG. 17.

FIG. 18 shows that distortion for the green color component is now constrained to +−1%. This is already better than the prior art's distortion performance, but can be further improved by using electronic correction. The advantage of this example is that there is no loss of effective resolution from electronic distortion correction. In both these examples of eight-element lens assembly designs, the lens assembly is capable of resolving 65 line pairs/mm, good enough to satisfy MTF requirements for 1920×1080 display resolutions. The MTF performance therefore improved from SD-capability to full HD-capability in these exemplary embodiments while the cost of the lens assembly was reduced.

Figure 19:
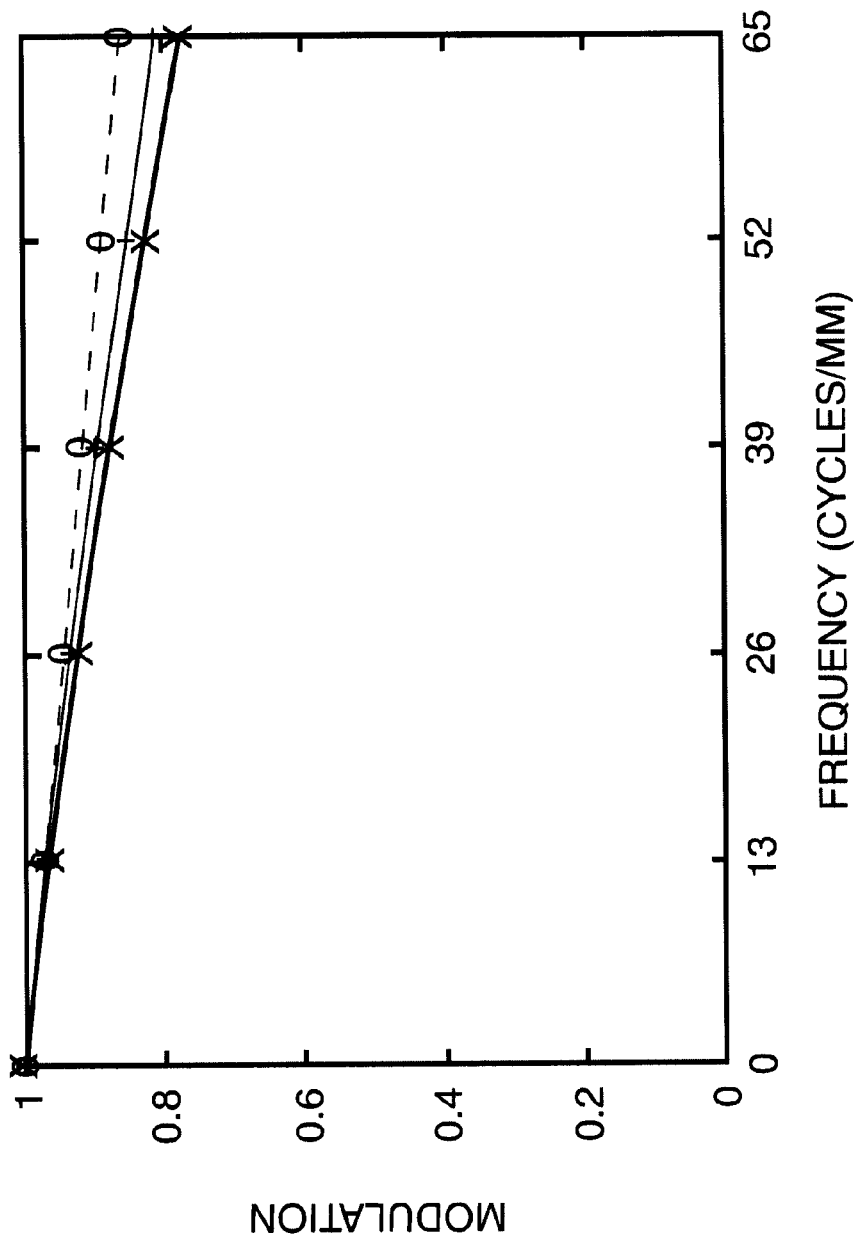
FIG. 19 is the MTF diagram of the lens assembly of FIG. 17 at 550 nm of the above lens assembly (scale=65 line pair/mm)
Figure 20:
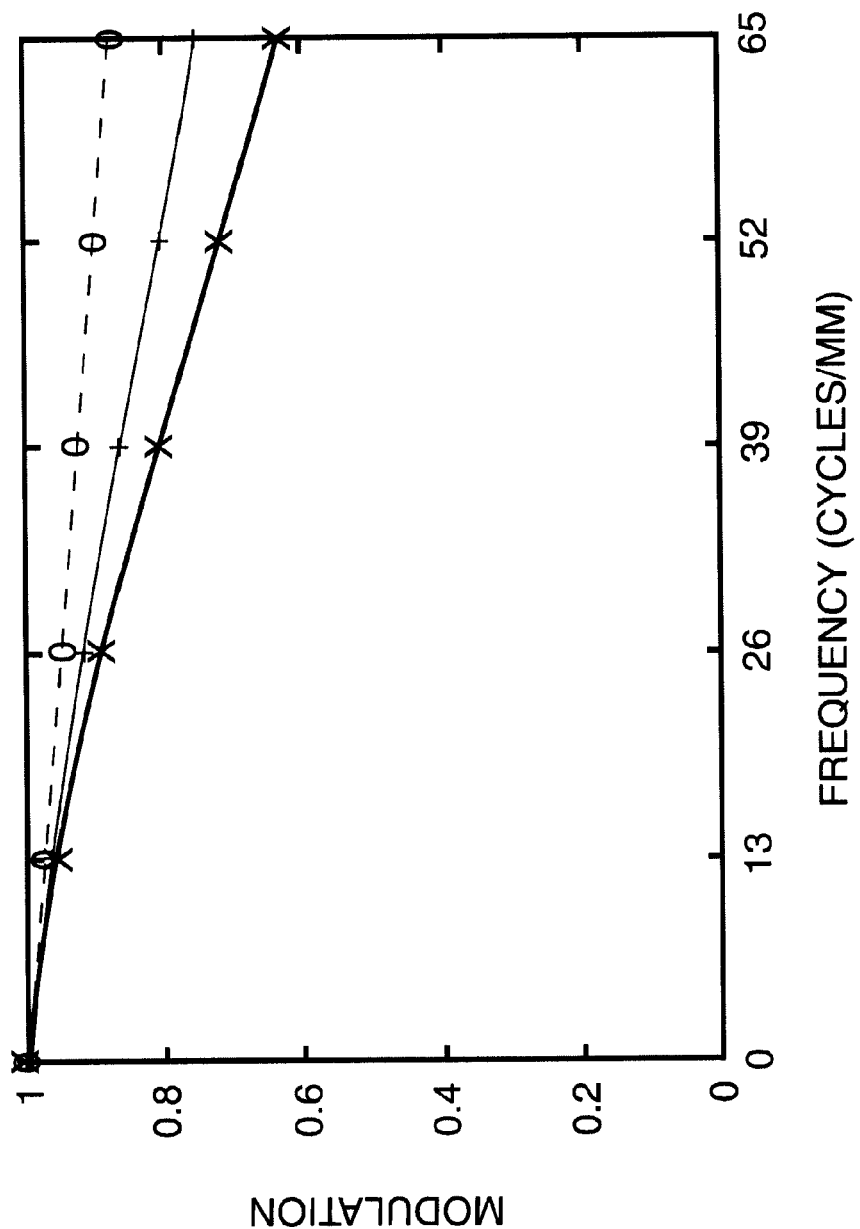
FIG. 20 is the MTF diagram of the lens assembly of FIG. 17 at 460 nm of the above lens assembly (scale=65 line pair/mm)
Figure 21:
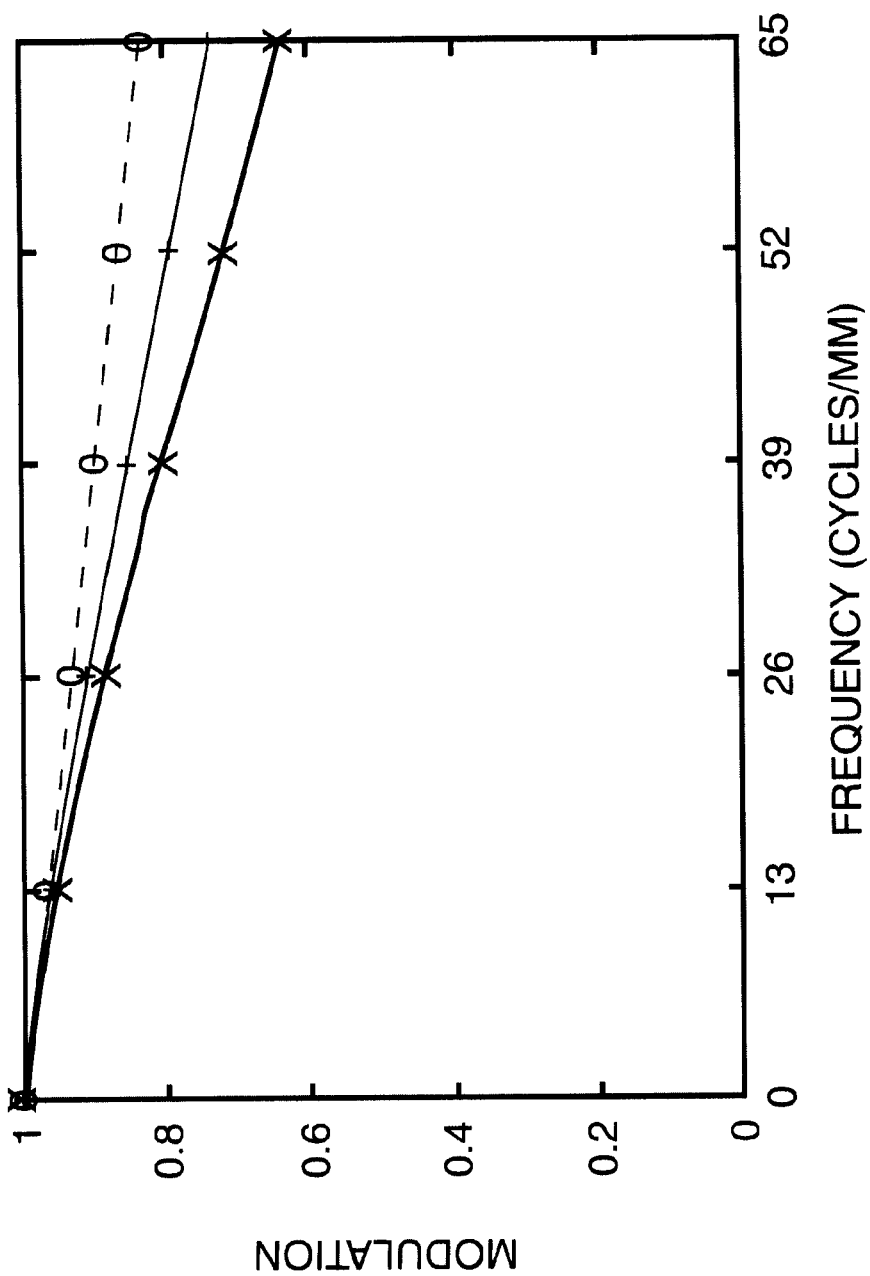
FIG. 21 is the MTF diagram of the lens assembly of FIG. 17 at 640 nm of the above lens assembly (scale=65 line pair/mm)
Figure 22A:
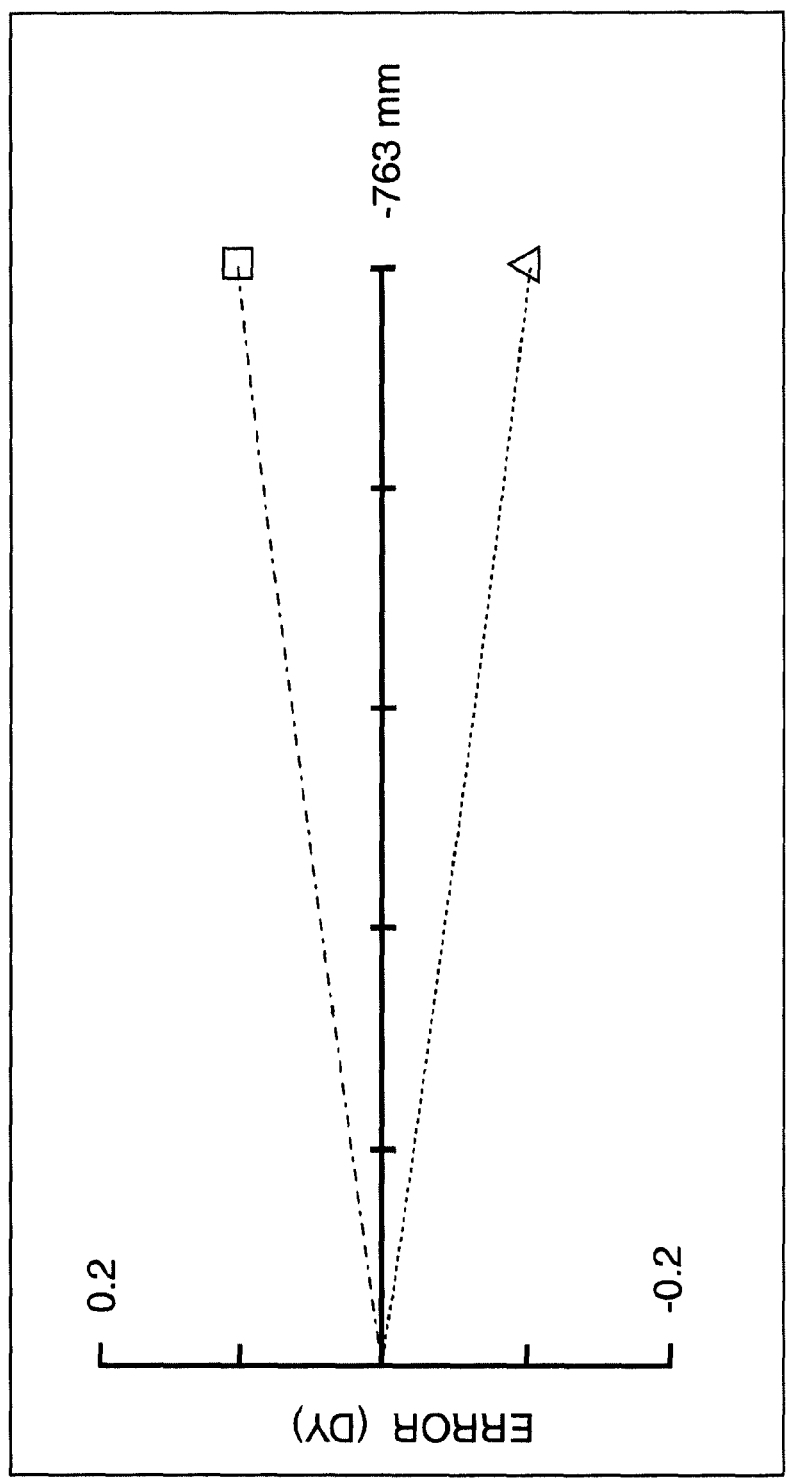
FIG. 22-A is the LCA diagram of the lens assembly of FIG. 17 before electronic correction.
Figure 22B:
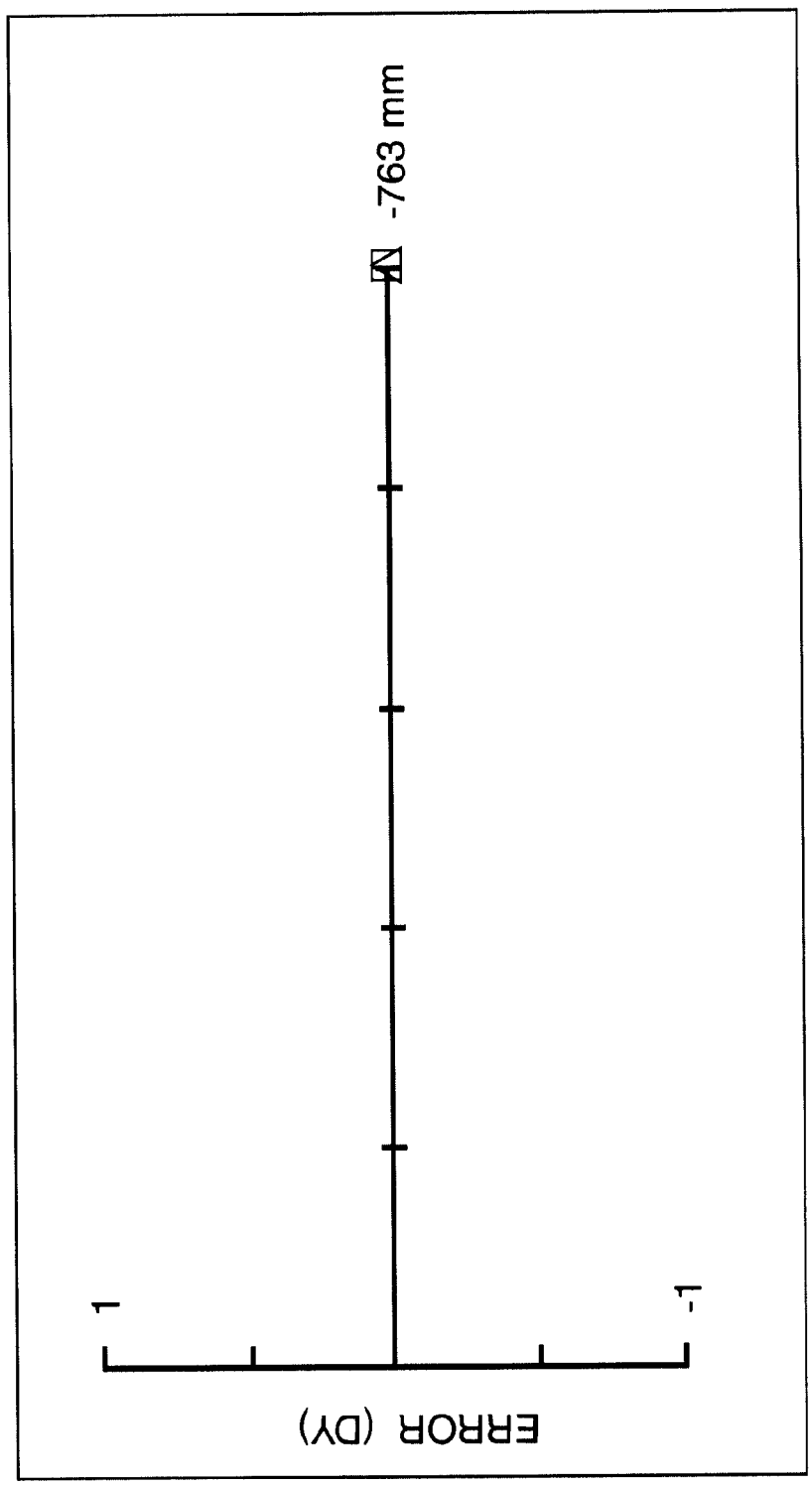

FIGS. 19, 20, and 21 are the monochromatic MTF plots in this example where the improvement over the MTF of the original prior art lens assembly shown in FIG. 3 is paramount. FIGS. 22-A and 22-B show the LCA before and after electronic correction in this example. Before electronic correction the LCA is ±0.103 mm, or about ±13 pixels. This is substantial degradation in LCA compared to the prior art lens assembly. However, as in the previous exemplary embodiment, this is corrected to better than the prior art design's specs by using electronic correction as shown in FIG. 22-B. The final LCA after electronic correction remains imperceptible, namely, less than 0.1%.

It should be noted that the light transmission for this eight-element modified lens assembly is also better than the prior art design in spite of retaining one plastic aspherical element. The reduction of three lens elements helps improve the transmissivity 16% from 0.77 to 0.90. In both examples, the improved transmissivity results in higher image brightness on the screen.

Some advantages of the disclosed methodology, as illustrated and mentioned in the above examples, include lower cost, lower lens-element count, better MTF, better LCA, better distortion, and better transmissivity. However, there are yet other advantages in using the method of the exemplary embodiments. Since the burden of optically correcting for LCA and distortion is removed, the method could be used to further optimize the lens assembly for the correction of longitudinal color aberration, astigmatism, coma, spherical aberrations, and field curvature. In other words, all types of optical aberrations may be improved using the method of the exemplary embodiments by trading off improvements in the MTF, transmissivity, and reduction of lens-element count and cost.

Electronic distortion correction as described in the exemplary embodiments is applicable to other situations encountered in projection systems, such as the correction of distortion resulting from display geometry (curved screens, for example) and/or projection geometry (off-axis projection). Dynamic correction of LCA and distortion in zoom lenses is possible by sensing the lens focal length (for example, with a rotary transducer) and using this parameter to generate correction data in real time, as the zoom lens barrel is manipulated.

Figure 23A:
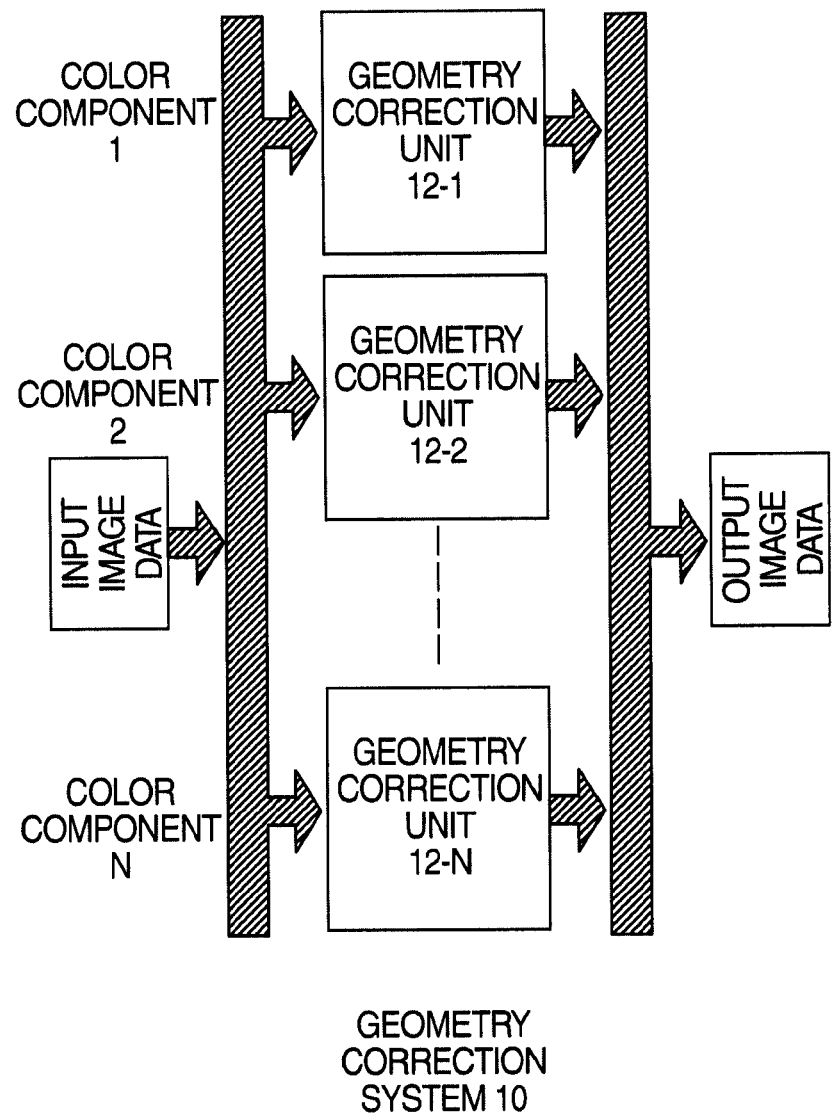
FIG. 23-A shows a geometry correction unit of the exemplary embodiment.
Figure 23B:
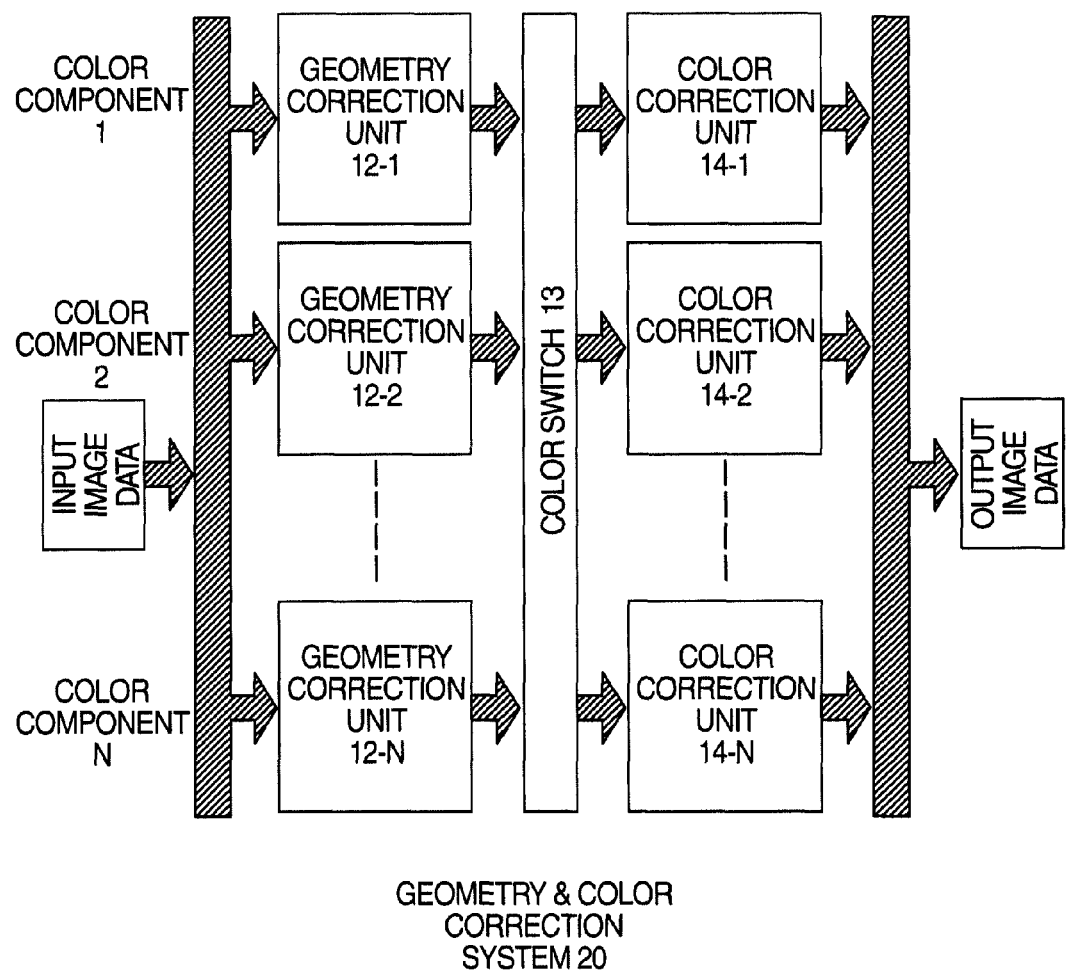

This method of zoom lens aberration correction allows simplification of the lens assembly by reduction in lens-element count, simplifying the movable lens groups, eliminating high-cost low-dispersion lens materials, and reducing the number of aspherical lens elements, Referring now to FIG. 23-A, to achieve such optimization for a lens assembly, in one embodiment, geometry correction system 10 uses a number of geometry correction units 12-1 to 12-N to pre-compensate for geometric distortions (distortion) and spatial variations for color components 1 to N independently (LCA). These color components could be RGB primaries or any other set of components like RGBCy or RGB-CyMY, where Cy, M, Y represent Cyan, Magenta, Yellow, respectively.

In an exemplary embodiment, each geometry correction unit 12-1 to 12-N includes a function evaluator to evaluate warp maps, and a filtering block for interpolating the pixel values.

Geometry correction units pre-compensate for distortion and LCA by warping the input image data for the associated color component and produce pre-compensated image data, such that, when the image is displayed, it is visually free of distortions and LCA. Additionally, the geometry correction units can also correct for the image modulator misconvergence and misalignment which results from the misalignment of color components originating from different micro-display panels. The transformation performed by geometry correction units have the inverse effect and pre-compensate for the geometric distortions of the display system. Since each color component is independently warped, any color dependent geometric distortions, such as LCA or misconvergence, are automatically corrected.

The geometric transformation or the warp for each color component is a mapping between input pixel coordinates $(u_i, v_i)$ and output pixel coordinates $(x_i, y_i)$:

$$(u_i, v_i) \Leftrightarrow (x_i, y_i) \tag{1}$$

Figure 24:
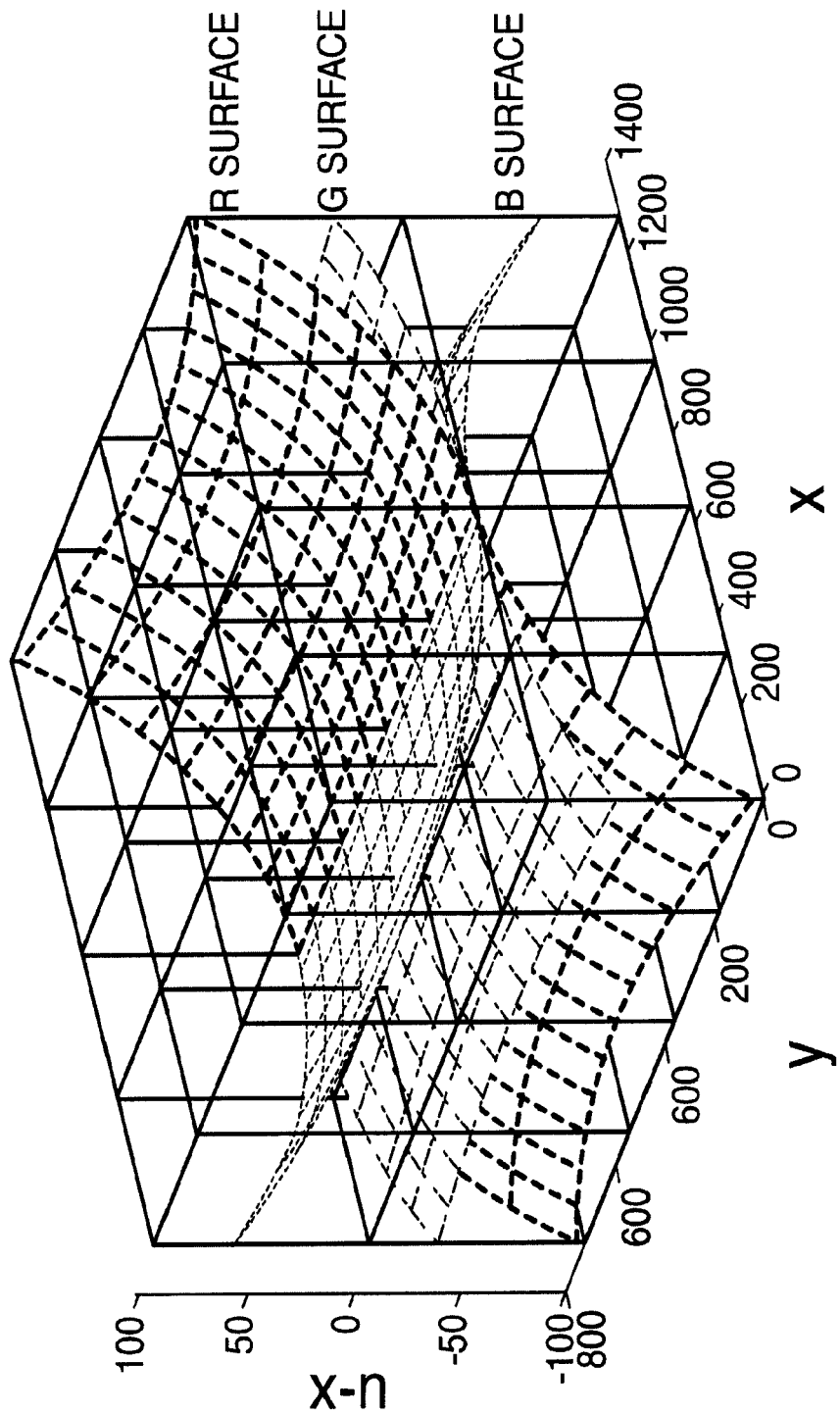
FIG. 24 shows independent geometry-correcting surface functions for correction of red, green, and blue color components.

These transformed data can be represented by various means, with the most accurate case being grid transformation data or LUT, storing the mapping for each pixel. Usually, however, LUT's are used to store only these data for a subset of pixels, which results in a loss of accuracy. In one exemplary embodiment, surface functions are used to represent the grid transformation data mapping, which has the benefits of being both accurate and efficient for hardware implementation. As shown in FIG. 24, independent geometry-correcting surface functions are used for correction of red, green, and blue color components. From the geometry correction perspective, a surface function is an equation that is evaluated in hardware to reproduce equation (1). For the particular case of a bi-cubic polynomial surface as an example, these equations take the form:

$$u_k(x, y) = \sum_{i,j=0...3} a_{k,ij} x^i y^j, \text{ for color } k = 1 ... N \quad (2)$$

$$v_k(x, y) = \sum_{i,j=0...3} b_{k,ij} x^i y^j, \text{ for color } k = 1 ... N \quad (3)$$

Describing output spatial coordinates in terms of input spatial coordinates is referred to as a forward map. Alternatively, each input spatial coordinate can be described in terms of output spatial coordinates, which is referred to as an inverse map. The benefits of using inverse maps for describing geometry transformations are well-known, namely the image in hardware can be constructed in scanline order on the output and holes in the output image can be avoided.

After obtaining the input position coordinate $(u_i, v_i)$ in the input space and any derivative information, pixel values for each color component are generated by filtering. An efficient filter architecture producing high image quality that can be used is detailed in the U.S. Pat. No. 7,064,770, assigned to Silicon Optix Inc.

Referring now to FIG. 23-B, in another exemplary embodiment, geometry and color correction system 20 performs color correction in addition to geometry correction. Color correction involves the compensation of luminance non-uniformity and chrominance non-uniformity. In this embodiment, the outputs of all geometry correction units are input to a color switch 13. Color switch 13 inputs one or more geometry correction outputs to every color correction unit 14-1 to 14-N. If necessary, all geometry correction unit outputs can be input to every color correction unit, as is the case if the color correction for each color component depends on all other color component values. For each color correction unit 14-1 to 14-N, the inputs from one or more geometric correction units is selectively chosen by color switch 13.

The color values can also be mathematically described by functions of the input coordinates and color values. The functions, shown below, are referred to as the color correction functions, or simply color functions:

$$\vec{C}' = \vec{F}_c(x, y, \vec{C}) \quad (4)$$

The above equation is in vector form where each color value is described by a vector $\vec{C} = (C_1, \ldots, C_N)$, which for example corresponds to (R,G,B) in the RGB color space. In color component form, for each color component k, the function can be written as:

$$C'_k = F_{c,k}(x, y, \vec{C}) \quad (5)$$

The color correction function will in general depend on the spatial coordinates. When both geometry and color correction is applied, the color correction follows the geometry correction and the domain coordinates $(x, y, \vec{C})$ for the color function are defined in the output of the geometry correction, hence the notation (x,y) is used rather than (u,v).

Likewise the lens assembly performance improvement and cost reduction could be used in an image acquisition device like a camera or a camcorder. Image acquisition devices may also have a zoom lens. In this exemplary embodiment, the lens assembly of the image acquisition device could be made less elaborate and with fewer elements, and lower cost.

In both these examples, the constraint of distortion correction and LCA correction is relaxed. Instead the geometry correction units for each color component pre-compensate for the distortions and LCA in the same fashion as described for the RPTV example.

The electronic correction described in the exemplary embodiments could be performed automatically in response to dynamically varying external conditions. One example is the possible vibration-induced misalignment of optical elements when the system is being transported. Another example is the correction of zoom lens aberrations in rear and front projection devices. Besides optical aberrations, electronics can also be used to correct for mechanical misconvergence and misalignment. For example, in typical three-panel projection systems, each micro-display panel is attached to the face of a prism and this attachment has six degrees of freedom, or six potential ways of being misaligned, and any or all of these misalignments could be in effect to varying degrees. The three panels together can be misaligned or misconverged in hundreds of different ways.

In an image acquisition device, like a digital still or video camera, image sensors (CCD or CMOS, typically) could be attached to a combining prism, rather than micro-displays, and the same principles apply. Many possible misconvergences exist, in addition to aberrations from the capture optics (distortions, LCA), and these may be corrected by suitably processing the sensor data. The electronic corrections could be done on-line while previewing a monitor for ideal image capture. Alternatively, the electronic correction could be done off-line for power saving, and/or the ability to apply more computational power than is available in an embedded processor.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for cost and performance optimization in a lens assembly, having a plurality of lens elements, said method comprising:
    designing a lens assembly, wherein cost and performance optimization is achieved by simplifying the lens assembly by relaxing constraints designed for optically correcting lateral chromatic aberration (LCA) and distortion;
    obtaining input image data, having a number of color components, through a plurality of geometry correction units, such that each of said plurality of geometry correction units corresponds to one color component of the number of color components;
    electronically warping the input image data, using the geometry correction units, that utilize surface functions to represent grid transformation data mapping, independently for each color component of the number of color components to pre-compensate for the LCA and the distortion, and form an output image data which is pre-compensated for the LCA and the distortion; and projecting the output image data onto the lens assembly for further optical processing.

2. The method of claim 1, wherein simplifying the lens assembly involves at least one of: reducing the number of lens elements, reducing the number of movable lens groups, reducing the thickness of lens elements, eliminating high-cost low-dispersion lens elements, eliminating aspherical lens elements, and changing the material of lens elements.

3. The method of claim 1, wherein the method optimizes the lens assembly to achieve improved modulation transfer function.

4. The method of claim 1, wherein the method optimizes the lens assembly for the correction of at least one of longitudinal color aberration, astigmatism, coma, spherical aberrations, and field curvature.

5. The method of claim 1, wherein the lens assembly includes a zoom lens.

6. The method of claim 1, wherein green color component distortion in the lens assembly is constrained to better than a set level, and wherein red and blue color component aberrations relative to green component are unconstrained in the lens assembly and corrected electronically.

7. The method of claim 1, wherein green color component distortion in the lens assembly is constrained to better than a tighter first set level, and wherein red and blue color component aberrations relative to green component are constrained to better than a looser second set level in the lens assembly and corrected electronically.

8. The method of claim 1, wherein a projection display system is adapted to project an image based on image data through the lens assembly onto a display surface.

9. The method of claim 8, wherein the method enables an image projected by the lens assembly to cover a desired surface area with no visual lateral chromatic aberration and no visual distortion.

10. The method of claim 8, further electronically correcting for at least one of misconvergence and misalignment.

11. The method of claim 8, wherein the method increases the image brightness on the display surface by at least one of reducing the number of lens elements and reducing the thickness of the lens elements.

12. The method of claim 8, further electronically correcting for at least one of luminance non-uniformity and chrominance non-uniformity.

13. The method of claim 8, further electronically correcting for geometric distortions, including display geometry and projection geometry.

14. The method of claim 8, further using lens offset, and electronically correcting for the resulting lateral chromatic aberration and distortion.

15. The method of claim 8, further sensing information from the displayed image, and electronically performing dynamic LCA correction and distortion correction based on the sensed information.

16. The method of claim 8, used in a rear projection display system.

17. The method of claim 8, wherein the method eliminates the need for aspherical lens elements.

18. The method of claim 8, used in a front projection display system.

19. The method of claim 1, wherein an image acquisition system is adapted for capturing an image utilizing the lens assembly having at least one zoom lens element.

20. The method of claim 19, wherein the method enables an image captured by the lens assembly to fill a sensor surface area with no visual lateral chromatic aberration and no visual distortion.

21. The method of claim 19, wherein the warping is done upon capturing an image in the image acquisition device to create an image for preview.

22. The method of claim 19, wherein the warping is done offline.

23. The method of claim 22, wherein the offline warping is used to reduce power consumption in the image acquisition device.

24. The method of claim 19, wherein the method optimizes the lens assembly for the correction of at least one of longitudinal color aberration, astigmatism, coma, spherical aberrations, and field curvature.

25. The method of claim 19, further electronically adjusting the aspect ratio of a captured image to a desired setting.

26. The method of claim 1, wherein a color correction unit is used in addition to the geometry correction unit to compensate for at least one of luminance non-uniformity and chrominance non-uniformity of independent color components.

27. The method of claim 1, wherein each color component of the number of color components is emitted by a separate and distinct light source of a plurality of light sources and is obtained by different ones of the plurality of geometry correction units.

28. The method of claim 1, wherein the plurality of geometry correction units obtain the input image data corresponding to each color component of the number of color components simultaneously.

* * * * *